United States Patent
Washio

(10) Patent No.: US 8,565,548 B2
(45) Date of Patent: Oct. 22, 2013

(54) IMAGE PROCESSING APPARATUS WHICH PERFORMS ANTI-ALIASING ON INPUT IMAGE DATA AND IMAGE PROCESSING METHOD THEREOF

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/333,453

(22) Filed: Dec. 21, 2011

(65) Prior Publication Data

US 2012/0163730 A1  Jun. 28, 2012

(30) Foreign Application Priority Data

Dec. 24, 2010 (JP) ................................. 2010-287152

(51) Int. Cl.
- *G06K 9/40* (2006.01)
- *G09G 5/00* (2006.01)
- *G09G 5/02* (2006.01)

(52) U.S. Cl.
USPC ............ 382/269; 382/266; 345/611; 345/596

(58) Field of Classification Search
USPC ......... 345/581, 611, 614–615, 619; 358/3.07, 358/3.26, 447; 382/190, 199, 266, 267, 269
See application file for complete search history.

(56) References Cited

U.S. PATENT DOCUMENTS

| | | | |
|---|---|---|---|
| 4,437,122 A | 3/1984 | Walsh et al. | |
| 4,847,641 A | 7/1989 | Tung | |
| 5,231,519 A * | 7/1993 | Koike | 358/3.07 |
| 7,372,471 B1 * | 5/2008 | Hutchins | 345/611 |
| 7,408,559 B2 * | 8/2008 | Keshet | 345/611 |
| 7,518,618 B2 * | 4/2009 | Loce et al. | 345/611 |
| 2007/0206025 A1 * | 9/2007 | Oka | 345/611 |
| 2009/0148063 A1 * | 6/2009 | Hosoda et al. | 382/266 |
| 2010/0253981 A1 * | 10/2010 | Higashiyama et al. | 358/3.26 |

FOREIGN PATENT DOCUMENTS

| | | |
|---|---|---|
| JP | 6-139350 | 5/1994 |
| JP | 2000-156784 | 6/2000 |

* cited by examiner

*Primary Examiner* — Andrae S Allison
(74) *Attorney, Agent, or Firm* — Finnegan, Henderson, Farabow, Garrett & Dunner, LLP

(57) ABSTRACT

An image processing apparatus and method is provided which performs anti-aliasing on input image data. The apparatus and method may be utilized to improve resolution of, for example, images formed by a group of dots and lines, such as characters and marks. The apparatus and method disclosed herein can perform anti-aliasing with a lighter processing load than previously disclosed methods.

6 Claims, 33 Drawing Sheets

FIG. 5

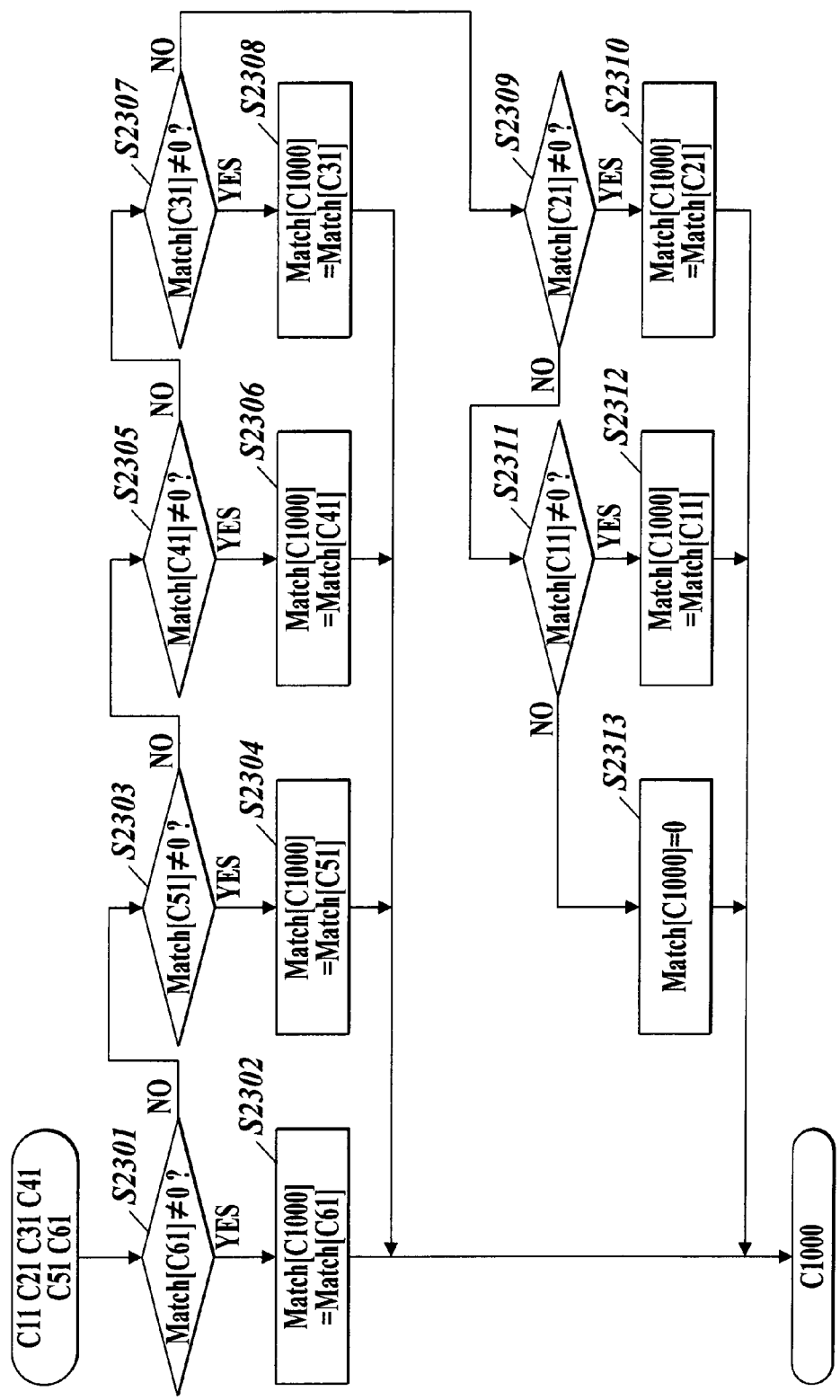

IMAGE PROCESSING APPARATUS WHICH PERFORMS ANTI-ALIASING ON INPUT IMAGE DATA AND IMAGE PROCESSING METHOD THEREOF

BACKGROUND OF THE INVENTION

1. Field of the Invention

The present invention relates to an image processing apparatus which performs anti-aliasing on input image data and an image processing method thereof.

2. Description of Related Art

Conventionally, there are cases where stair-like jaggies occur at the boundaries of different colors where the different colors are adjacent to each other resulting in degradation of image quality in images (line drawings) formed by a group of dots and lines, such as characters and marks displayed on a monitor or printed by a printer. Jaggies are prone to occur when granularity of pixels which constitute a line drawing is not sufficient. Therefore, techniques to spuriously improve resolution have been devised. Such techniques are referred to as anti-aliasing or smoothing.

Among such techniques, for example, U.S. Pat. No. 4,437,122 discloses a technique in which resolution of an image is tripled horizontally and vertically and occurrence of jaggy is judged by using conditional judgment in positional relations of ON/OFF of dots in a viewing window of 3×3 pixels including a focused pixel, and the pixel value of the focused pixel which is divided in to 3×3 pixels is changed according to the matched conditions when a plurality of specific conditions prepared in advance are matched.

Moreover, U.S. Pat. No. 4,847,641 discloses a technique to spuriously improve resolution by judging occurrence of jaggy by judging whether the ON/OFF of dots in a viewing window matches a specific pattern referred to as a template and outputting the halftone while the resolution is maintained as it is. However, this technique is difficult because the input pixel is fundamentally constituted of two-bit information of ON/OFF and data processing be complicated when a multi-level image including halftone is applied.

In view of such problem, JP H6-139350 discloses a technique to carry out jaggy detection configured of multi-level data and not the conventional jaggy detection by binary pattern in order to perform smoothing on multi-level image which is to be input. According to this technique, smoothing can be performed on characters and line drawings having halftone values. However, a detection pattern is needed for each tone in order to perform appropriate jaggy detection in this technique. Thus, there is a problem that the circuit size and processing cost increase.

In view of the above problem, JP 2000-156784 discloses a technique to perform smoothing on color halftone characters and halftone line drawings which are printed on a halftone background such as a photograph. Here, after binarizing the multi-level data, occurrence of jaggy is detected by pattern matching and also smoothing is performed only on a region which includes characters and line drawings indicated by attribute signals to obtain a pixel density which becomes the background from neighboring pixels of the jaggy, and an output pixel value is obtained based on the densities of the character and background.

As for binarizing, processing in which edges in an image are detected by using an edge detection operator and intensities of the detected edges are binarized by a certain threshold is described. As for a device for detecting edges, an existing differential operator such as Sobel or Laplacian is used. Then, pixels having edge intensity exceeding the threshold are judged as edge pixels, and binarizing is carried out by converting the pixel values of the edge pixels to 255 and the pixel values of non-edge pixels to 0. Thereafter, pattern matching by using template data is carried out to the binarized edge information.

SUMMARY OF THE INVENTION

Conventionally, the generally used edge operator calculates differences between a focused pixel and neighboring pixels, or, calculates differences between neighboring pixels in all directions, and such calculation processing is performed for each pixel in a pixel block of a predetermined size. Therefore, in the technique described in the above JP 2000-156784, great amount of calculation needs to be performed to obtain the edge information and this creates a problem that the processing load be heavy.

In view of the above problems, an object of the present invention is to provide an image processing apparatus in which anti-aliasing can be performed with lighter processing load and an image processing method thereof.

In order realize the above object, an image processing apparatus for performing anti-aliasing on input image data reflecting one aspect of the present invention includes a viewing window setting section which sets a viewing window of a predetermined size which includes a focused pixel, a difference determination section which extracts a plurality of combinations of two predetermined adjacent pixels in the viewing window set by the viewing window setting section and determines a difference between input pixel values of the two extracted pixels for each combination, a determination information obtaining section which obtains combination determination information based on a combination of determination results obtained by the difference determination section, and a pixel value calculation section which obtains an output pixel value of the focused pixel by carrying out a weighted addition of an input pixel value of the focused pixel and an input pixel value of a predetermined neighboring pixel which is adjacent to the focused pixel based on the combination determination information obtained by the determination information obtaining section.

Preferably, the determination information obtaining section obtains the combination determination information with lesser number of determination results which are obtained by the difference determination section and which are referred to for obtaining the combination determination information than pixels referred to for obtaining the determination results.

Preferably, the image processing apparatus further includes a storage section which stores the determination results obtained by the difference determination section, and the viewing window setting section sets the viewing window so that the focused pixel is located at a predetermined position and changes the setting position of the viewing window every time the output pixel value is obtained so that a pixel which is to be the focused pixel is selected in a predetermined order, and the determination information obtaining section obtains the combination determination information by referring to at least a part of the determination results stored in the storage section.

In order to realize the above object, an image processing method for performing anti-aliasing on input image data reflecting one aspect of the present invention includes setting a viewing window of a predetermined size which includes a focused pixel, extracting a plurality of combinations of two predetermined adjacent pixels in the viewing window set in the setting, determining a difference between input pixel values of the two extracted pixels for each combination, obtaining combination determination information based on a combination of determination results obtained in the extracting and the determining, and calculating an output pixel value of the focused pixel by carrying out a weighted addition of an input pixel value of the focused pixel and an input pixel value of a predetermined neighboring pixel which is adjacent to the focused pixel based on the combination determination information obtained in the obtaining.

Preferably, in the obtaining, the combination determination information is obtained with lesser number of determination results which are obtained in the extracting and the determining which are referred to for obtaining the combination determination information than pixels referred to for obtaining the determination results.

Preferably, the image processing method further includes storing the determination results obtained in the extracting and the determining in a predetermined storage section, and in the setting, the viewing window is set so that the focused pixel is located at a predetermined position and the setting position of the viewing window is changed every time the output pixel value is obtained so that a pixel which is to be the focused pixel is selected in a predetermined order, and in the obtaining, the combination determination information is obtained by referring to at least a part of the determination results stored in the storage section.

BRIEF DESCRIPTION OF THE DRAWINGS

The above and other objections, advantages and features of the present invention will become more fully understood from the detailed description given hereinbelow and the appended drawings which are given by way of illustration only, and thus are not intended as a definition of the limits of the present invention, and wherein:

FIG. 5 is a diagram which conceptually explains about templates;

FIG. 33 is a flowchart which explains another example of the processing for selecting final template data.

DESCRIPTION OF THE PREFERRED EMBODIMENTS

Figure 1:
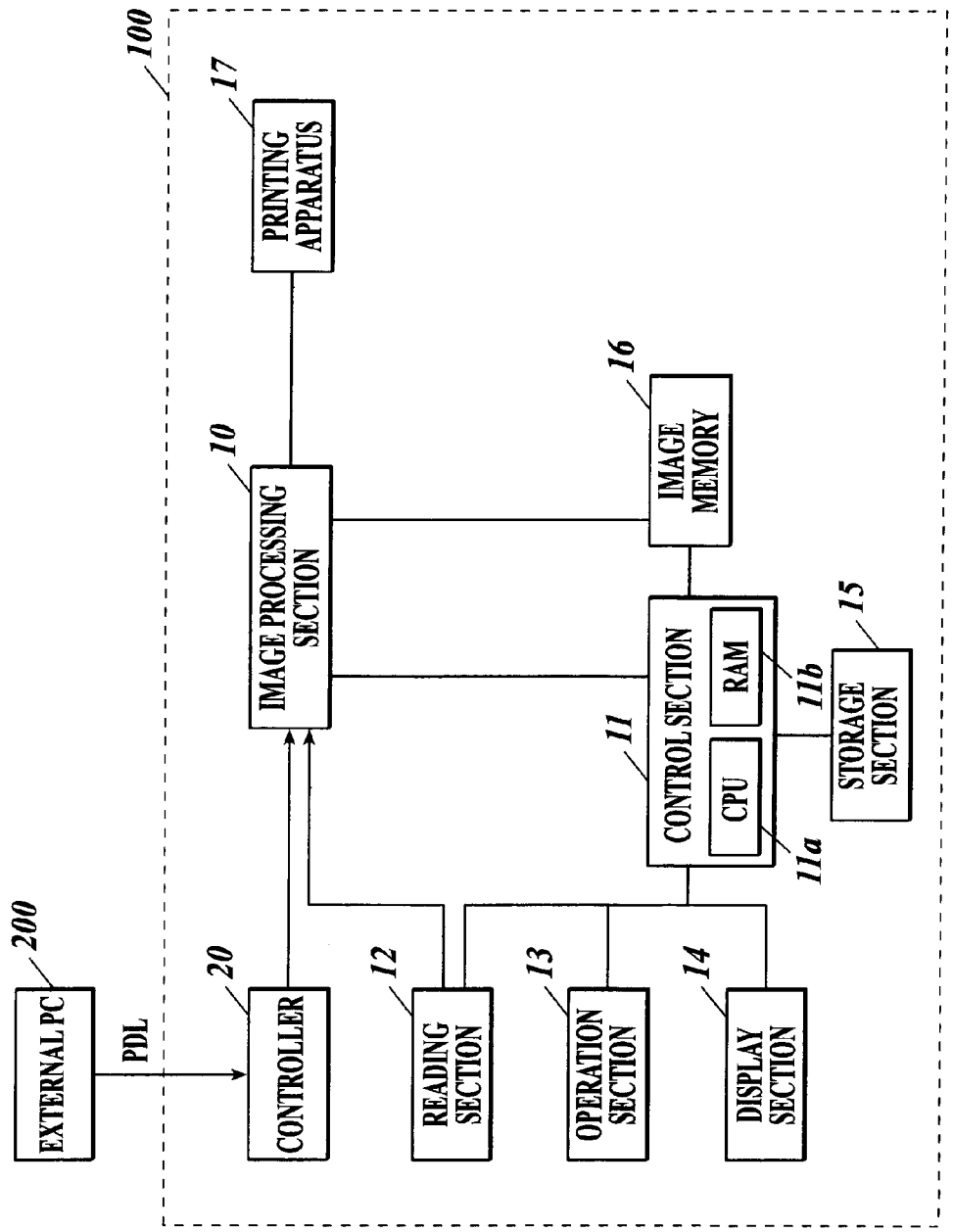
FIG. 1 is a diagram showing a functional configuration of a MFP according to an embodiment.

Hereinafter, the MFP (Multi Function Peripheral) according to an embodiment of the present invention will be described with reference to the drawings. However, the scope of the invention is not limited to the illustrated examples. Here, the MFP is a composite-type image forming apparatus including a plurality of functions such as a reproducing function and printing function. In the following description, the same reference numeral will be appended to sections which have the same function and configuration, and their description will be omitted.

The MFP 100 is connected to an external PC (Personal Computer) 200 as shown in FIG. 1 and can generate image data from data in the form of PDL (Page Description Language) transmitted from the external PC 200, process the image, and then perform printing.

The MFP 100 is configured by including a controller 20, an image processing section 10, a control section 11, a reading section 12, an operation section 13, a display section 14, a storage section 15, an image memory 16 and a printing apparatus 17 as shown in FIG. 1, for example.

The controller 20 generates image data of each pixel by rasterizing processing.

For example, document data created in the external PC 200 is converted into the form of PDL by printer driver software and transmitted to the controller 20. The controller 20 analyzes the PDL commands included in the PDL data which is transmitted, assigns pixels to each image unit to be rendered, and generates the image data wherein a pixel value is set for each of the assigned pixels by the rasterizing processing. The image unit to be rendered may be referred to as an object. An image is generated for each color of C (Cyan), M (Magenta), Y (Yellow) and K (Black).

In this embodiment, the controller 20 is built in the MFP 100. However, the controller 20 may alternatively be provided outside of the MFP 100.

The control section 11 is configured by including a CPU (Central Processing Unit) 11a, a RAM (Random Access Memory) 11b, and the like. The control section 11 integrally controls each section of the MFP 100 by executing various processing such as a predetermined calculation and a control of image processing in the image processing section 10 in cooperation with various processing programs stored in the storage section 15.

The reading section 12 includes a scanner which has an optical system or CCD (Charge Coupled Device), and generates image signals (analog signal) by optically scanning documents. The generated image signals are subjected to various correction processing in a processing section which is not shown, and then, the processed image signals are digitized and output to the image processing section 10.

The operation section 13 is for inputting operating instructions of an operator, and the operation section 13 includes various types of keys, a touch panel which is configured integrally with the display section 14, and the like. The operation section 13 generates an operation signal according to the operation and outputs the generated operation signal to the control section 11.

The display section 14 displays an operation screen and the like on the display according to the control by the control section 11.

The storage section 15 stores parameters, setting data, and the like necessary for processing in addition to various types of processing programs. A non-volatile memory such as a hard disk can be used as the storage section 15.

The image memory 16 is a memory to store image data. A DRAM (Dynamic RAM), hard disk and the like can be used as the image memory 16.

The printing apparatus 17 performs printing based on an image to be printed which is input from the image processing section 10. The image to be printed is an image which is generated by the image processing section 10 performing image processing to the image generated by the controller 20.

The printing apparatus 17 performs printing by the electrographic method, and is configured by including a paper feeding section, an exposure section, a developing section, a fixing section and the like, for example. When printing, the exposure section irradiates a photosensitive drum with a laser beam based on the image data and forms an electrostatic latent image. The electrostatic latent image is developed by the developing section, and a toner image is formed on the photosensitive drum. A toner image is formed for each color of C, M, Y and K. The toner image in each color is transferred on top of one another on an intermediate transfer belt to form a color image. The color image is transferred onto a paper fed from the paper feeding section by a transferring roller and the like, and is subjected to fixing processing by the fixing section.

The image processing section 10 conducts image processing on the image data input from the controller 20 or the image data input from the reading section 12. The image processing includes scaling processing, resolution conversion processing, tone correction processing, screen processing and the like, for example. Also, the image processing section 10 performs color conversion processing on the image data input from the reading section 12 to convert the RGB to the colors of YMCK. The image processing section 10 performs the above-mentioned image processing and generates the image data to be printed. In this embodiment, the image processing section 10 performs anti-aliasing processing to smooth out the tone between a predetermined pixel and its neighboring pixels in the input image data.

Figure 2:
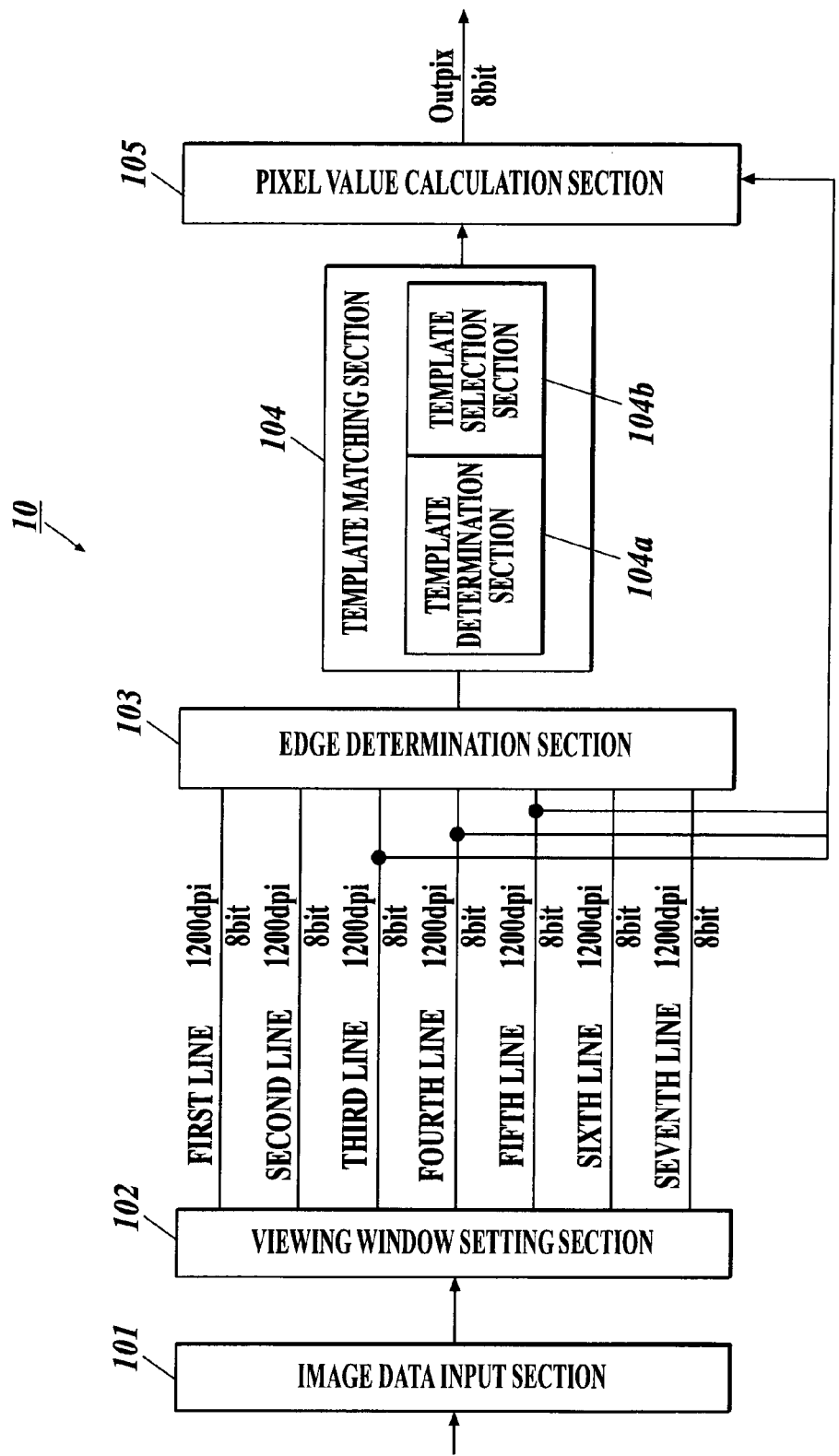
FIG. 2 is a diagram showing a functional configuration of an image processing section.

FIG. 2 shows component parts of the image processing section 10 which function mainly when the anti-aliasing processing is performed. The image processing section 10 includes an image data input section 101, a viewing window setting section 102, an edge determination section 103, a template matching section 104 and a pixel value calculation section 105 as shown in FIG. 2, for example. In this embodiment, anti-aliasing processing is performed on input image data of 1200 dpi constituted of 1 pixel×8 bits in the configuration shown in FIG. 2. The anti-aliasing processing executed in the configuration shown in FIG. 2 is performed with respect to each color of CMYK. The anti-aliasing processing may be conducted only on certain colors, and not on every color of CMYK.

The image data input section 101 inputs image data which are output from the controller 20 and the reading section 12, and holds the data in a predetermined buffer. At this time, the image data input section 101 may input the data to the image data input section 101 after performing the above-mentioned various types of image processing on the data.

The viewing window setting section 102 sets image data included within the range of a preset viewing window W among the image data input to the image data input section 101.

Figure 3:
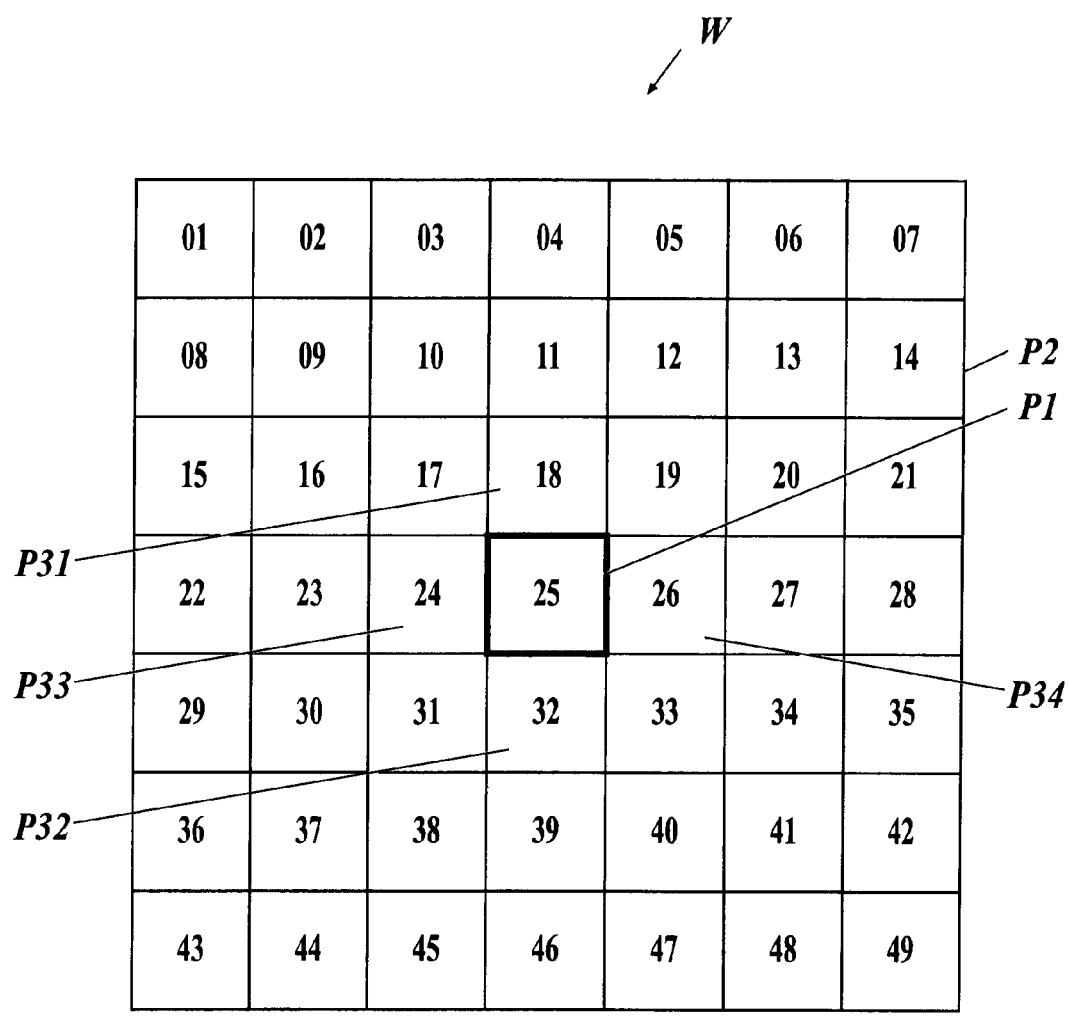
FIG. 3 is a diagram which explains a viewing window.

This viewing window W is configured in a matrix of height×width: 7×7 pixels as shown in FIG. 3, for example. A focused pixel P1 is set at the center (position [25] in the drawing) of this viewing window W and its surrounding pixels P2 are set around the focused pixel P1 (positions [01] to [49] except [25] in the drawing). Then, the adjacent pixels which are positioned above, below, left and right of the focused pixel P1 among the surrounding pixels P2 are respectively set as neighboring pixels P31 to P34. The viewing window is not limited to the form shown in this embodiment and its shape, size and so forth can be set arbitrarily.

The viewing window setting section 102 sets the image data which is included within the range of the viewing window W configured as mentioned above so that the pixel which is to be subject to the after-mentioned anti-aliasing is the focused pixel P1. For example, the viewing window setting section 102 sequentially shifts the range of the viewing window W from the upper left corner of the image to the lower right corner of the image every time the setting is performed so that all the pixels of the input image data will be sequentially set as the focused pixel P1.

The viewing window setting section 102 holds the image data in the range set by the viewing window W in a predetermined line memory in 1×7 pixel units. The viewing window setting section 102 outputs the image data thus held to the edge determination section 103 line by line.

Figure 4:
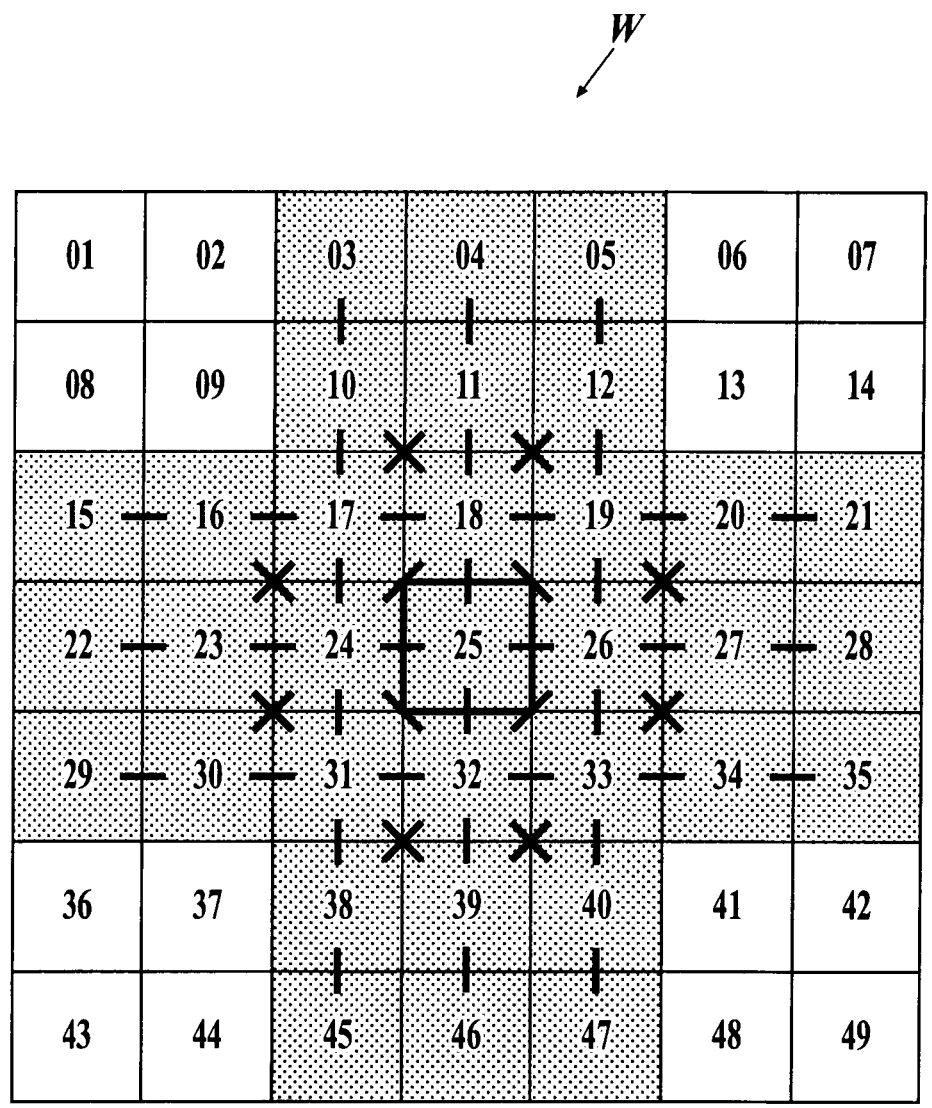
FIG. 4 is a diagram which explains targets for edge determination.

The edge determination section 103 inputs the image data which is output from the viewing window setting section 102 and performs the edge determination processing. Specifically, the edge determination section 103 performs the edge determination by extracting two predetermined neighboring pixels from the input image data of 7×7 pixels, calculating the difference between the pixel values thereof, determining whether this difference is equal to or more than the preset threshold value and expressing the determination result with a flag. The threshold value set here can be changed arbitrarily according to conditions of the tone and the like of the image. When the edge determination section 103 calculates the difference between the pixel values, the edge determination section 103 does not perform quantization such as binarization of the pixel values, and directly applies the values of 0 to 255 as they are in order to handle the halftone. Combinations of the pixels subject to the edge determination are all of the combinations of two pixels connected by a line as shown in FIG. 4, for example. That is, a total of 56 combinations of the pixels of "03" and "10", "04" and "11", "05" and "12", "10" and "17", "10" and "18", "11" and "17", "11" and "18", "11" and "19", "12" and "18", "12" and "19", "15" and "16", "16" and "17", "16" and "24", "17" and "18", "17" and "23", "17" and "24", "18" and "19", "18" and "24", "18" and "25", "18" and "26", "19" and "20", "19" and "26", "19" and "27", "20" and "21", "20" and "26", "22" and "23", "23" and "24", "23" and "31", "24" and "25", "24" and "30", "24" and "31", "24" and "32", "25" and "26", "25" and "32", "26" and "27", "26" and "32", "26" and "33", "26" and "34", "27" and "28", "27" and "33", "29" and "30", "30" and "31", "31" and "32", "31" and "38", "31" and "39", "32" and "33", "32" and "38", "32"

and "39", "32" and "40", "33" and "34", "33" and "39", "33" and "40", "34" and "35", "38" and "45", "39" and "46", and "40" and "47" are subject to the edge determination. The pixels expressed in a pattern in FIG. 4 indicate the pixels which are subject to the edge determination.

The edge determination section 103 outputs the result of the edge determination on each combination thus obtained to the template matching section 104.

Figure 5:
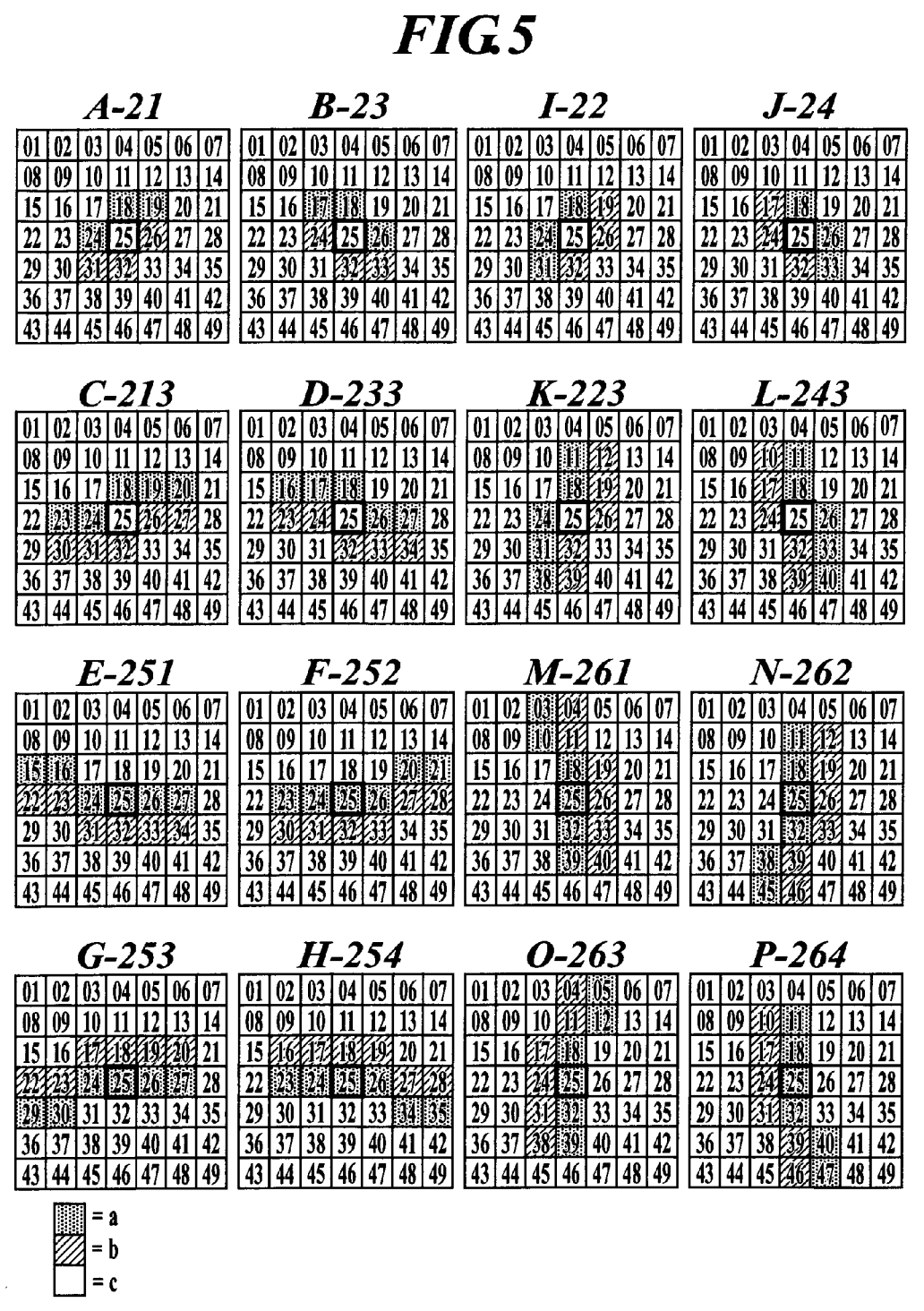

The template matching section 104 includes a template determination section 104a and a template selection section 104b. The template matching section 104 selects a corresponding template based on the result of the edge determination output from the edge determination section 103, and outputs the selection result to the image value calculation section 105. Specifically, the template determination section 104a performs narrowing down of a plurality of types of templates based on the input edge determination results. A specific method for the narrowing down of the templates will be described later. Then, the template selection section 104b finally specifies the matching template as the result of the narrowing down of the templates by the template determination section 104a, and outputs the template data showing the matching template to the pixel value calculation section 105. In this embodiment, any one is selected from the 16 types of templates as shown in FIG. 5. The number shown above each template in FIG. 5 indicates the template data. Each template is represented by three areas of the first to third areas. The first area is shown in pattern "a", the second area is shown in pattern "b", and the third area is shown in pattern "c". The first area expresses that no edge is generated between any of the pixels as the result of the edge determination. The second area expresses that no edge is generated between any of the pixels as the result of the edge determination. Then, it is indicated that an edge is generated between the first and second areas as the result of the edge determination. The third area shows pixels which are not subject to the edge determination. Templates are not limited to what are shown in FIG. 5, and their designs can be changed arbitrarily as long as the edges can be detected effectively. For example, the templates may be set according to the size or the like of the viewing window.

The pixel value calculation section 105 performs the anti-aliasing processing on the focused pixel P1 based on the template data input from the template matching section 104. Specifically, the pixel value calculation section 105 obtains data of the focused pixel P1 and the neighboring pixels P31 to P34 from the image data output from the viewing window setting section 102. Then, the pixel value calculation section 105 specifies a pixel to be referred to when performing the anti-aliasing processing from the neighboring pixels P31 to P34 based on the input template data. Also, the pixel value calculation section 105 specifies the weighting amounts respectively corresponding to the focused pixel P1 and the pixels to be referred to based on the input template data. Then, the pixel value calculation section 105 calculates the weighting average of the focused pixel P1 and the pixels to be referred to, and outputs the calculation result as the output pixel value of the focused pixel P1.

Subsequently, the anti-aliasing processing executed in the image processing section 10 which is configured as described above will be explained with reference to FIG. 6. The anti-aliasing processing is realized by the control section 11 executing an anti-aliasing program stored in the storage section 15 and controlling the image processing section 10. The anti-aliasing processing is executed when image data is input to the image data input section 101.

Figure 7:
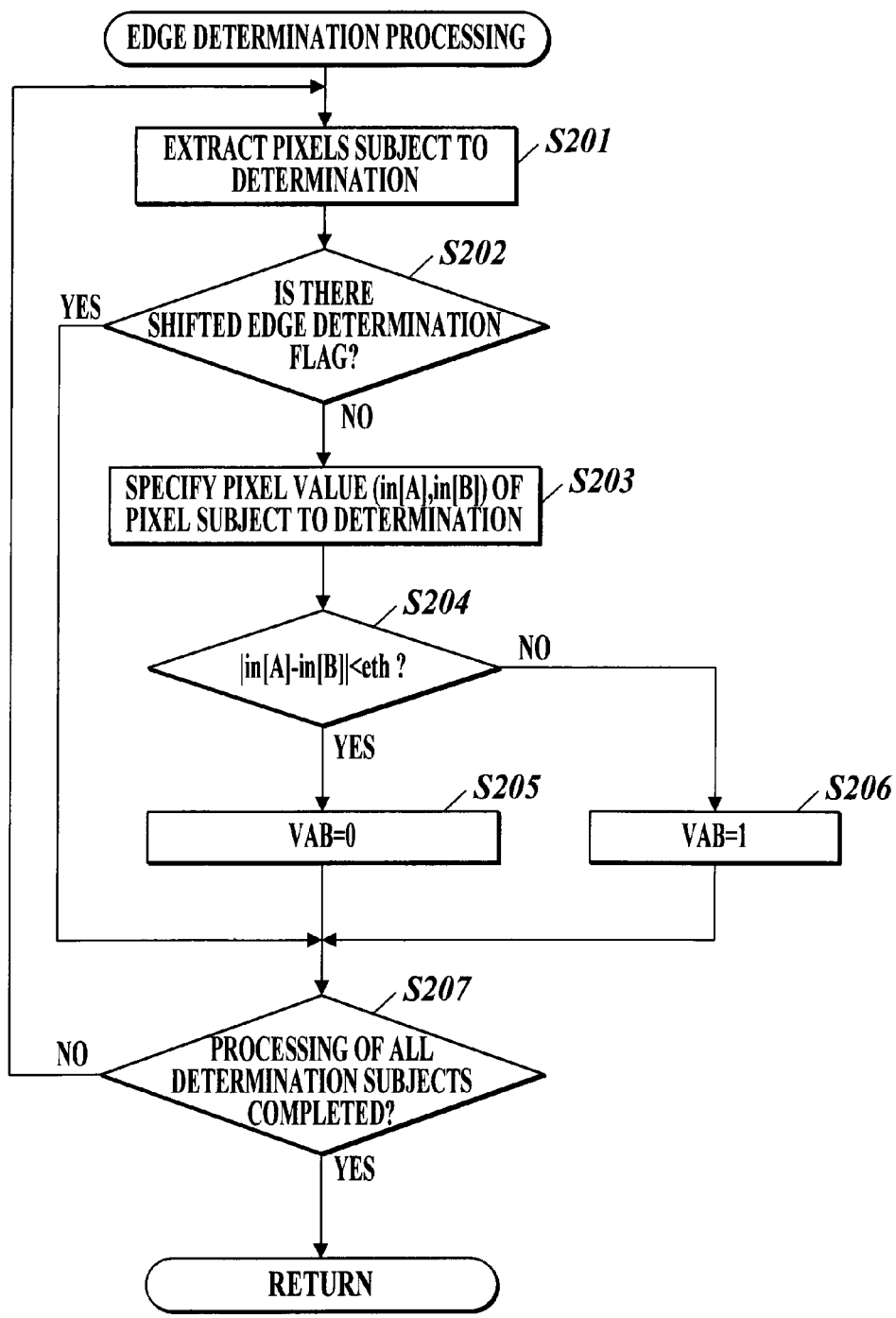
FIG. 7 is a flowchart which explains edge determination processing.

The control section 11 performs the setting of viewing windows as described above (step S101). Then, the control section 11 performs the edge determination processing as described above (step S102). Here, the edge determination processing will be explained with reference to FIG. 7.

First, the control section 11 extracts a combination of pixels which is to be subject to edge determination (step S201). The combination of pixels is extracted from the above-mentioned 56 combinations of pixels in a predetermined order. Then, the control section 11 refers to a predetermined edge determination flag storage area which is set in the RAM11b, and determines whether there is a shifted edge determination flag (VAB) corresponding to the extracted combination of pixels (step S202). That is, the control section 11 determines whether there is an edge determination flag which is shifted as described later in step S105 of the anti-aliasing processing. When the control section 11 does not determine that there is a shifted edge determination flag (VAB) (step S202: N), the control section 11 specifies the pixel values (in [A], in [B]) of the pixels which are subject to the edge determination (step S203).

The control section 11 determines whether the difference between the pixel values of the extracted combination of pixels is smaller than a threshold value eth (step S204). When the control section 11 determines that the difference between the pixel values is smaller than the threshold value eth (step S204: Y), the control section 11 judges that no edge is generated between the pixels, and sets the edge determination flag (VAB) to 0 (step S205). On the other hand, when the control section 11 does not determine that the difference between the pixel values is smaller than the threshold value eth (step S204: N), the control section 11 judges that an edge is generated between the pixels, and sets the edge determination flag (VAB) to 1 (step S206). For example, when the combination of pixels which are subject to edge determination is "03" and "10", the pixel values (in [A], in [B]) are represented as (in [03], in [10]), and the edge determination flag (VAB) is represented as (V0310). Then, when the threshold value eth is 128, for example, the edge determination flag (V0310) is set to 0 if the difference between the pixel values (in [03], in [10]) is less than 128, and the edge determination flag (V0310) is set to 1 if the difference between the pixel values is 128 or more. The edge determination flag (VAB) set as described above is held in the above-mentioned edge determination flag storage area.

On the other hand, when the control section 11 determines that there is a shifted edge determination flag in step S202 (step S202: Y), the control section 11 does not execute the processing of step S203 to step S206, and shifts to the processing of step S207.

The control section 11 determines whether edge determination has been performed to all the determination subjects, i.e. all of the pixel combinations which are subject to edge determination (step S207). When the control section 11 determines that edge determination has been performed to all the determination subjects (step S207: Y), the control section 11 terminates the processing. On the other hand, when the control section 11 does not determine that edge determination has been performed to all the determination subjects (step S207: N), the control section 11 shifts to the processing of step S201.

Figure 6:
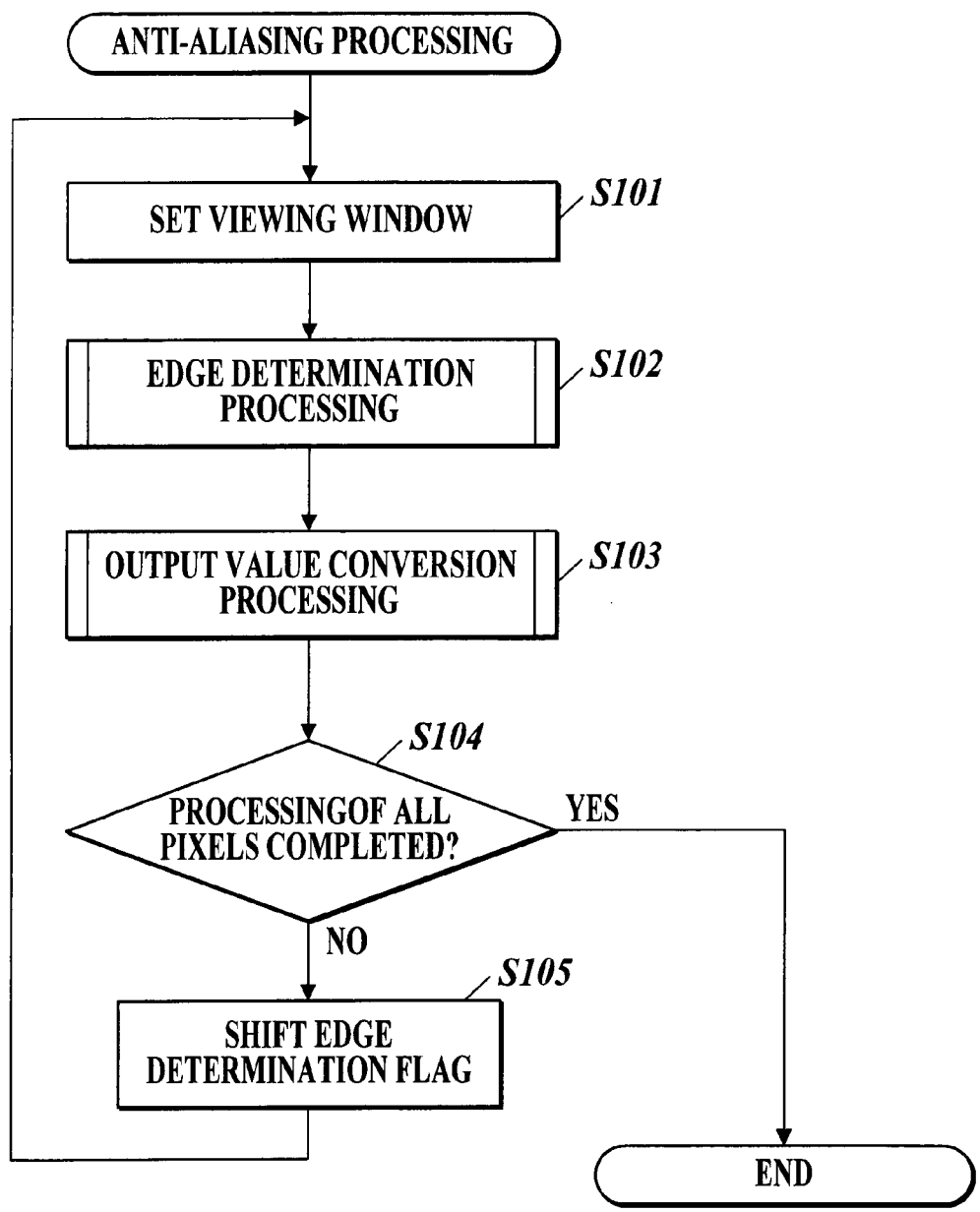
FIG. 6 is a flowchart which explains anti-aliasing.

Subsequently, after executing the edge determination processing, the control section 11 executes output value conversion processing as shown in FIG. 6 (step S103). Here, the output value conversion processing will be explained with reference to FIGS. 8 to 23.

Figure 8:
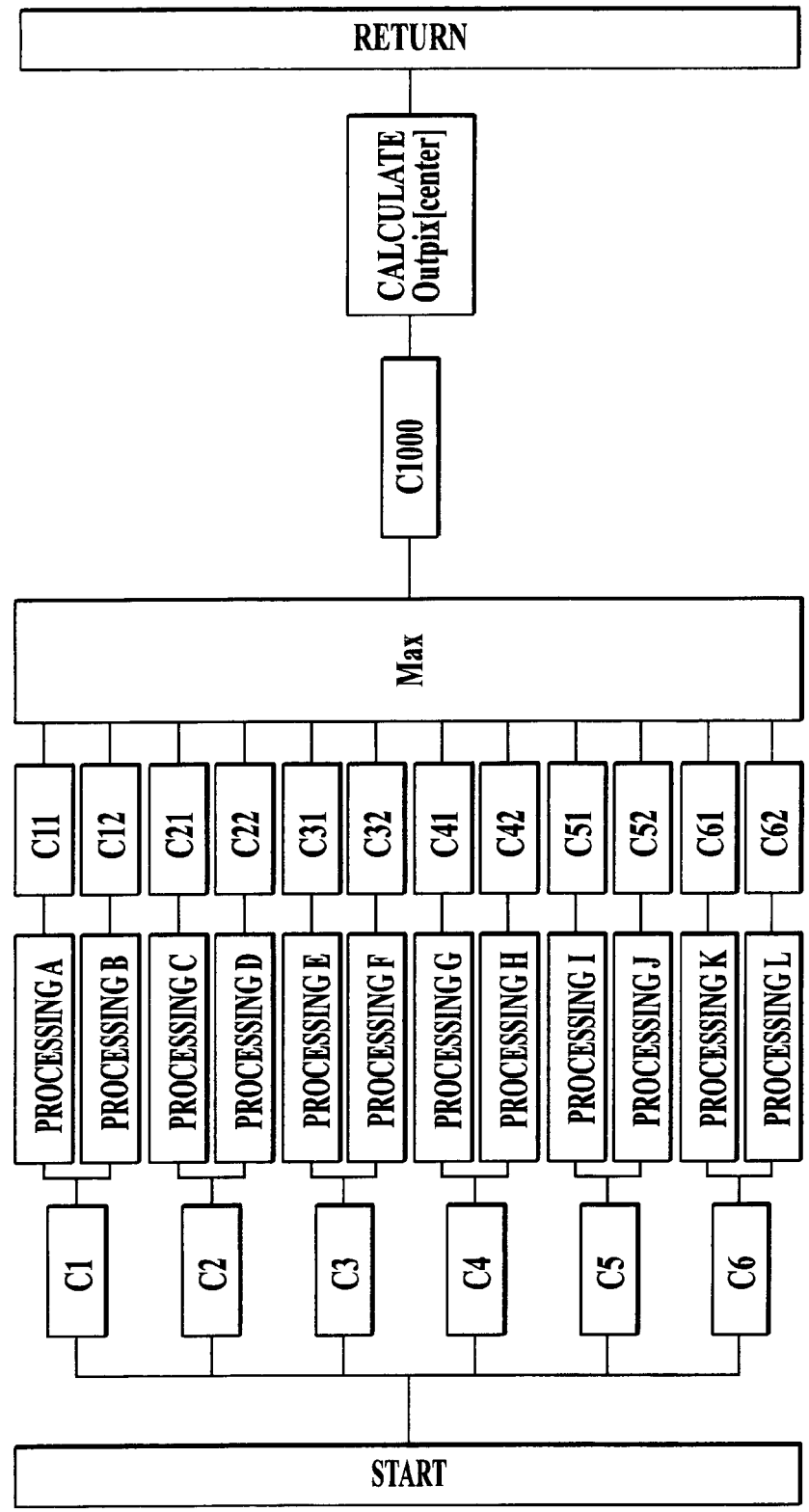
FIG. 8 is a diagram which explains an outline of output value conversion processing.

The control section 11 respectively inputs edge determination flags to C1 to C6 as shown in FIG. 8, and sequentially executes processing (processing A to L) to respectively obtain template data matching the edge determination flags from C11, C12, C21, C22, C31, C32, C41, C42, C51, C52, C61 and C62. Then, the control section 11 inputs the maximum value among template data values obtained from C11, C12, C21, C22, C31, C32, C41, C42, C51, C52, C61 and C62 to C1000. Then, the control section 11 calculates and outputs an output pixel value (Outpix [Center]) of the focused pixel P1 on the basis of the template data which is input to C1000 as mentioned above.

Figure 9:
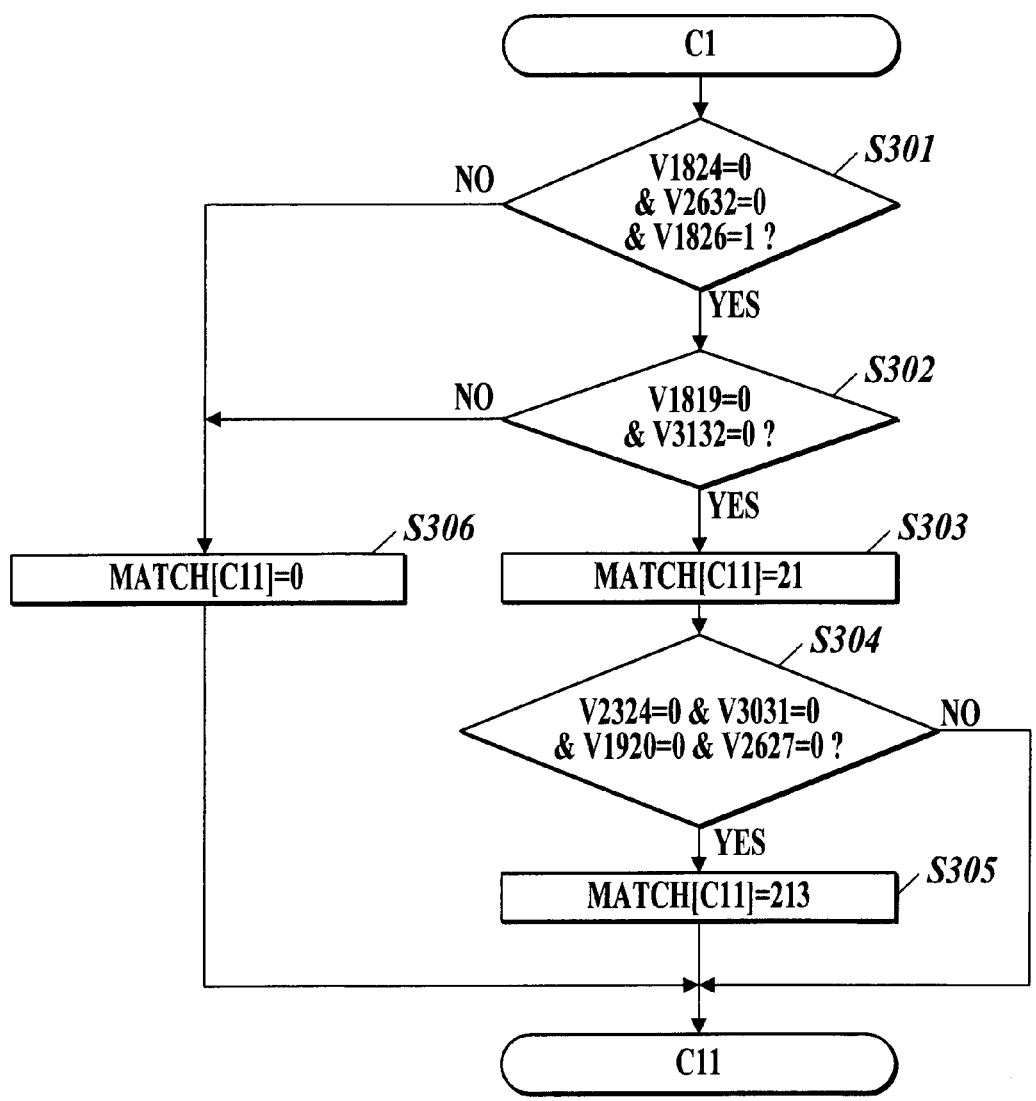
FIG. 9 is a flowchart which explains processing A.

Here, processing A will be explained in detail with reference to FIG. 9.

First, the control section 11 determines whether the edge determination flag (V1824) is 0, the edge determination flag (V2632) is 0 and the edge determination flag (V1826) is 1 (step S301). When the control section 11 determines that the flags meet the conditions in step S301 (step S301: Y), the control section 11 determines whether the edge determination flag (V1819) is 0 and the edge determination flag (V3132) is 0 (step S302). When the control section 11 determines that the flags meet the conditions in step S302 (step S302: Y), the control section 11 sets the template data (21) in match data (Match [C11]) in a predetermined storage area of the RAM11b (step S303). The template corresponding to the template data (21) is as shown in A of FIG. 5. Then, the control section 11 determines whether the edge determination flag (V2324) is 0, the edge determination flag (V3031) is 0, the edge determination flag (V1920) is 0 and the edge determination flag (V2627) is 0 (step S304). When the control section 11 determines that the flags meet the conditions in step S304 (step S304: Y), the control section 11 changes the data set in the match data (Match [C11]) to template data (213) (step S305), and terminates this processing. The template corresponding to the template data (213) is as shown in C of FIG. 5. On the other hand, when the control section 11 does not determine that the flags meet the conditions in step S304 (step S304: N), the control section 11 terminates this processing without executing the processing of step S305.

When the control section 11 does not determine that the flags meet the conditions in step S301 (step S301: N) or does not determine that the flags meet the conditions in step S302 (step S302: N), the control section 11 sets template data (0) which indicates that none of the templates is a match in the match data (Match [C11]) (step S306), and terminates this processing.

Figure 10:
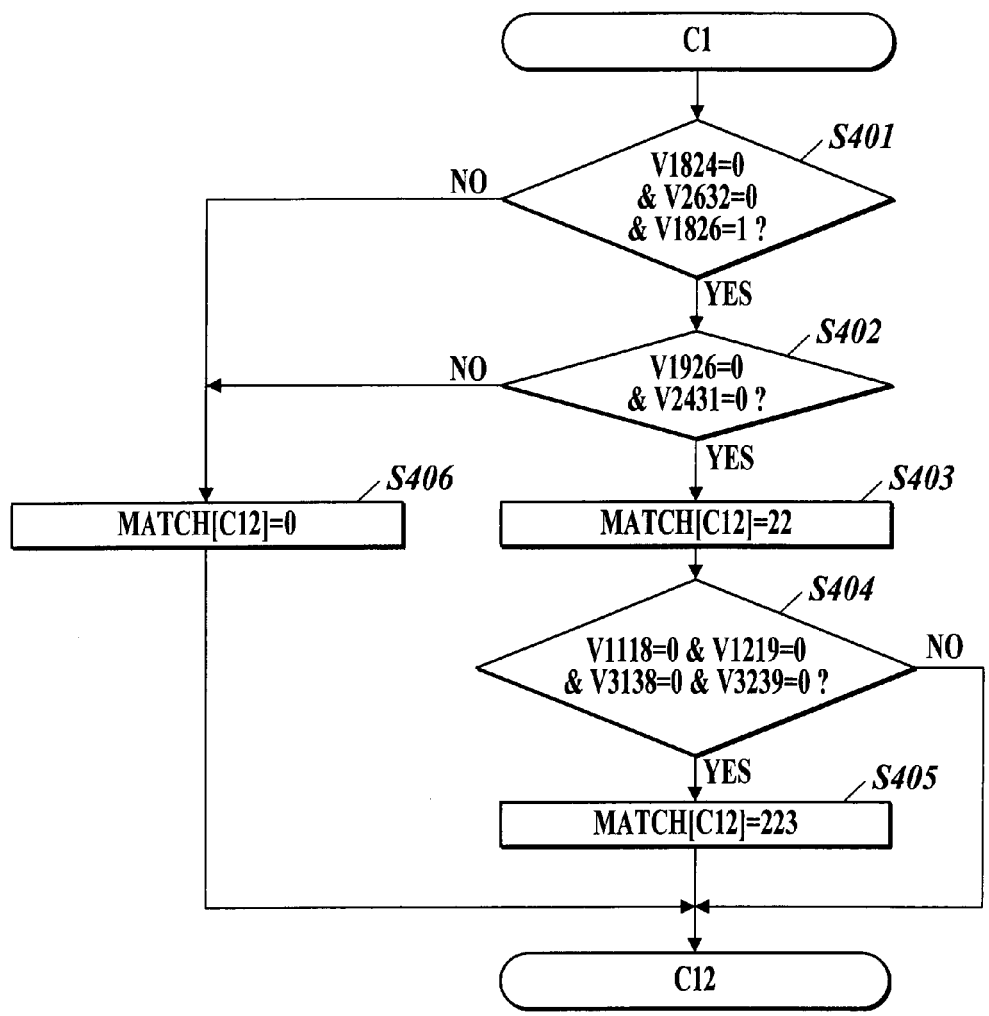
FIG. 10 is a flowchart which explains processing B.

Subsequently, processing B will be explained in detail with reference to FIG. 10.

First, the control section 11 determines whether the edge determination flag (V1824) is 0, the edge determination flag (V2632) is 0 and the edge determination flag (V1826) is 1 (step S401). When the control section 11 determines that the flags meet the conditions in step S401 (step S401: Y), the control section 11 determines whether the edge determination flag (V1926) is 0 and the edge determination flag (V2431) is 0 (step S402). When the control section 11 determines that the flags meet the conditions in step S402 (step S402: Y), the control section 11 sets template data (22) in match data (Match [C12]) in a predetermined storage area of the RAM11b (step S403). The template corresponding to the template data (22) is as shown in I of FIG. 5. Then, the control section 11 determines whether the edge determination flag (V1118) is 0, the edge determination flag (V1219) is 0, the edge determination flag (V3138) is 0 and the edge determination flag (V3239) is 0 (step S404). When the control section 11 determines that the flags meet the conditions in step S404 (step S404: Y), the control section 11 changes the data set in the match data (Match [C12]) to template data (223) (step S405), and terminates this processing. The template corresponding to the template data (223) is as shown in K of FIG. 5. On the other hand, when the control section 11 does not determine that the flags meet the conditions in step S404 (step S404: N), the control section 11 terminates this processing without executing the processing of step S405.

When the control section 11 does not determine that the flags meet the conditions in step S401 (step S401: N) or does not determine that the flags meet the conditions in step S402 (step S402: N), the control section 11 sets the template data (0) which indicates that none of the templates is a match in the match data (Match [C12]) (step S406), and terminates this processing.

Figure 11:
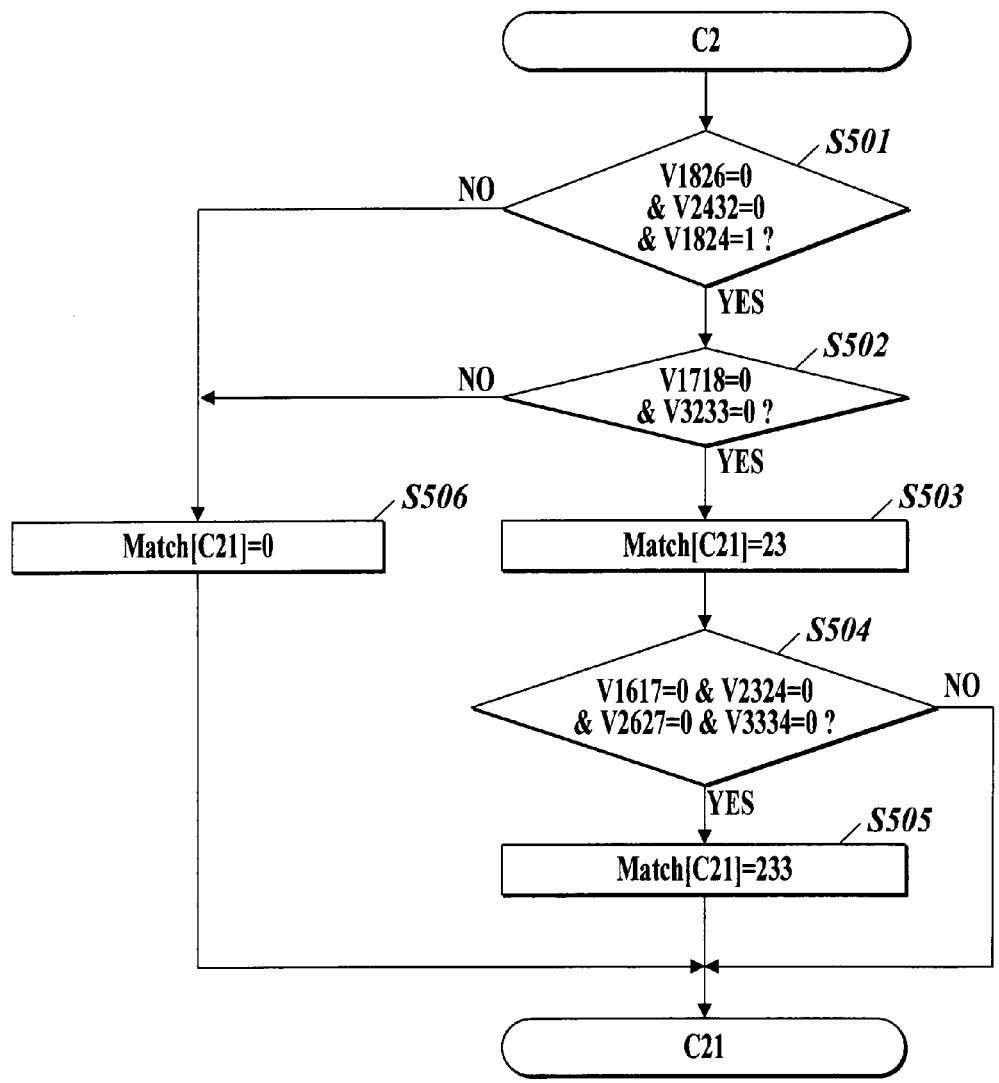
FIG. 11 is a flowchart which explains processing C.

Subsequently, processing C will be explained in detail with reference to FIG. 11.

First, the control section 11 determines whether the edge determination flag (V1826) is 0, the edge determination flag (V2432) is 0 and the edge determination flag (V1824) is 1 (step S501). When the control section 11 determines that the flags meet the conditions in step S501 (step S501: Y), the control section 11 determines whether the edge determination flag (V1718) is 0 and the edge determination flag (V3233) is 0 (step S502). When the control section 11 determines that the flags meet the conditions in step S502 (step S502: Y), the control section 11 sets template data (23) in match data (Match [C21]) in a predetermined storage area of the RAM11b (step S503). The template corresponding to the template data (23) is as shown in B of FIG. 5. Then, the control section 11 determines whether the edge determination flag (V1617) is 0, the edge determination flag (V2324) is 0, the edge determination flag (V2627) is 0 and the edge determination flag (V3334) is 0 (step S504). When the control section 11 determines that the flags meet the conditions in step S504 (step S504: Y), the control section 11 changes the data set in the match data (Match [C21]) to template data (233) (step S505), and terminates this processing. The template corresponding to the template data (233) is as shown in D of FIG. 5. On the other hand, when the control section 11 does not determine that the flags meet the conditions in step S504 (step S504: N), the control section 11 terminates this processing without executing the processing of step S505.

When the control section 11 does not determine that the flags meet the conditions in step S501 (step S501: N) or does not determine that the flags meet the conditions in step S502 (step S502: N), the control section 11 sets the template data (0) which indicates that none of the templates is a match in the match data (Match [C21]) (step S506), and terminates this processing.

Figure 12:
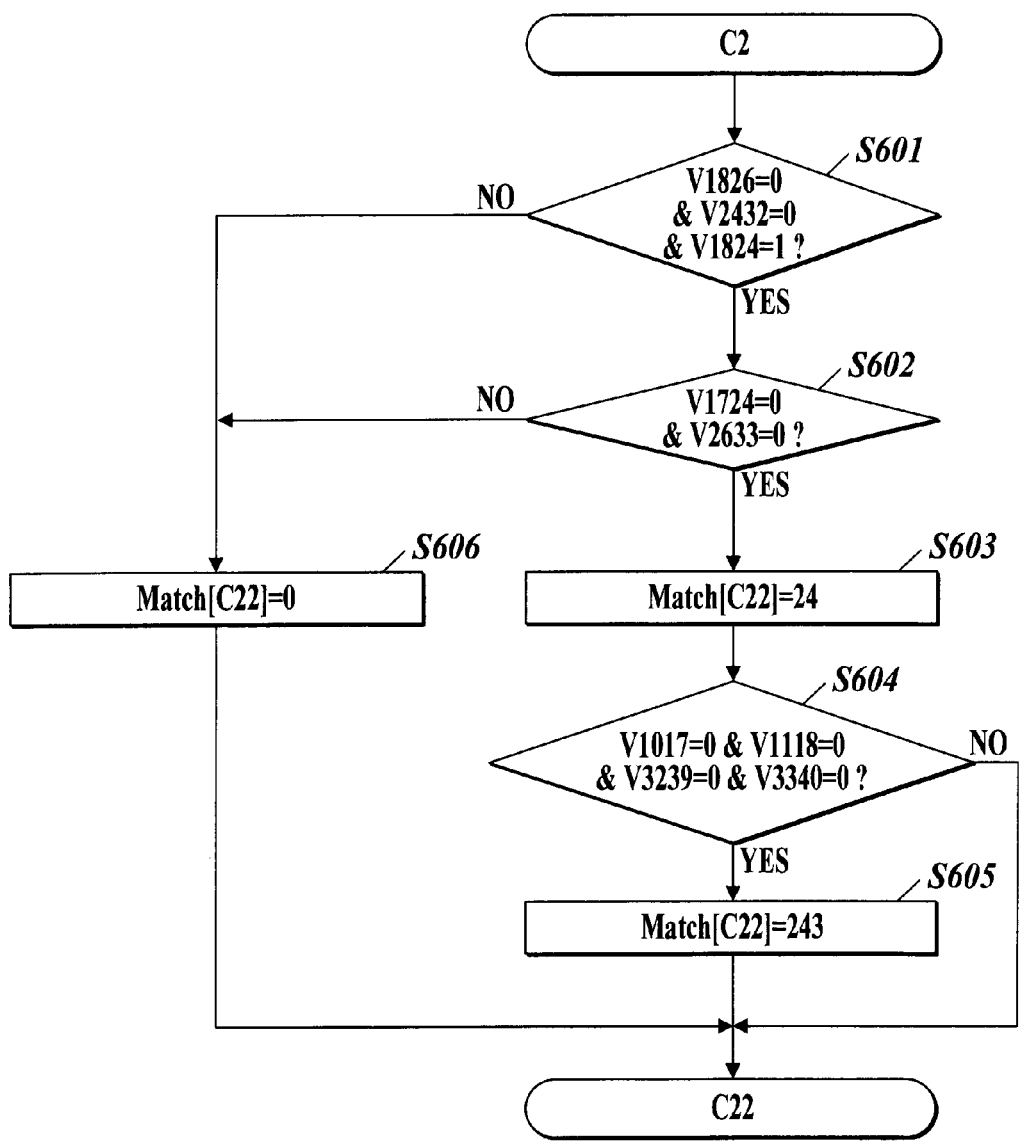
FIG. 12 is a flowchart which explains processing D.

Subsequently, processing D will be explained in detail with reference to FIG. 12.

First, the control section 11 determines whether the edge determination flag (V1826) is 0, the edge determination flag (V2432) is 0 and the edge determination flag (V1824) is 1 (step S601). When the control section 11 determines that the flags meet the conditions in step S601 (step S601: Y), the control section 11 determines whether the edge determination flag (V1724) is 0 and the edge determination flag (V2633) is 0 (step S602). When the control section 11 determines that the flags meet the conditions in step S602 (step S602: Y), the control section 11 sets template data (24) in match data (Match [C22]) in a predetermined storage area of the RAM11b (step S603). The template corresponding to the template data (24) is as shown in J of FIG. 5. Then, the control section 11 determines whether the edge determination flag (V1017) is 0, the edge determination flag (V1118) is 0, the edge determination flag (V3239) is 0 and the edge determination flag (V3340) is 0 (step S604). When the control section 11 determines that the flags meet the conditions in step S604

(step S604: Y), the control section 11 changes the data set in the match data (Match [C22]) to template data (243) (step S605), and terminates this processing. The template corresponding to the template data (243) is as shown in L of FIG. 5. On the other hand, when the control section 11 does not determine that the flags meet the conditions in step S604 (step S604: N), the control section 11 terminates this processing without executing the processing of step S605.

When the control section 11 does not determine that the flags meet the conditions in step S601 (step S601: N) or does not determine that the flags meet the conditions in step S602 (step S602: N), the control section 11 sets the template data (0) which indicates that none of the templates is a match in the match data (Match [C22]) (step S606), and terminates this processing.

Figure 13:
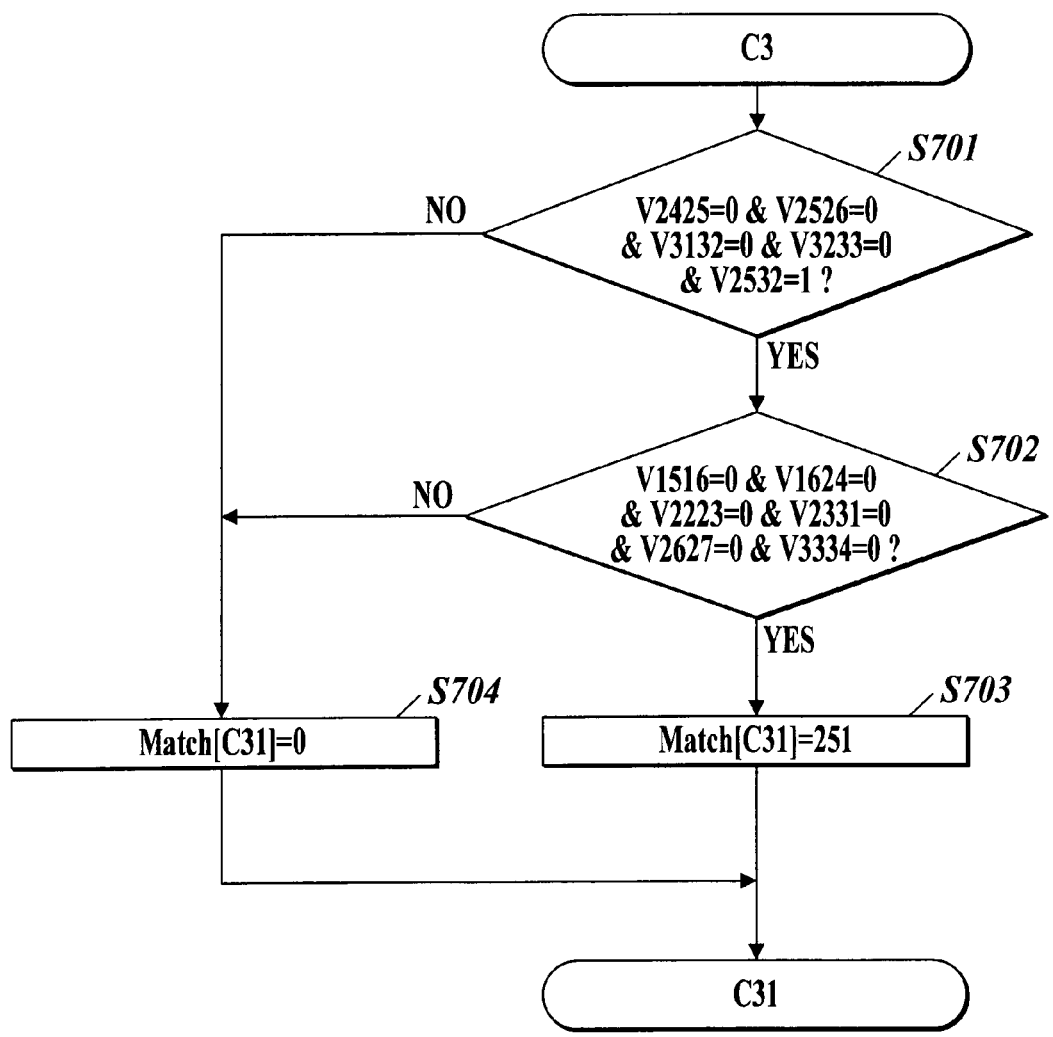
FIG. 13 is a flowchart which explains processing E.

Subsequently, processing E will be explained in detail with reference to FIG. 13.

First, the control section 11 determines whether the edge determination flag (V2425) is 0, the edge determination flag (V2526) is 0, the edge determination flag (V3132) is 0, the edge determination flag (V3233) is 0 and the edge determination flag (V2532) is 1 (step S701). When the control section 11 determines that the flags meet the conditions in step S701 (step S701: Y), the control section 11 determines whether the edge determination flag (V1516) is 0, the edge determination flag (V1624) is 0, the edge determination flag (V2223) is 0, the edge determination flag (V2331) is 0, the edge determination flag (V2627) is 0 and the edge determination flag (V3334) is 0 (step S702). When the control section 11 determines that the flags meet the conditions in step S702 (step S702: Y), the control section 11 sets template data (251) in match data (Match [C31]) in a predetermined storage area of the RAM11b (step S703), and terminates this processing. The template corresponding to the template data (251) is as shown in E of FIG. 5.

When the control section 11 does not determine that the flags meet the conditions in step S701 (step S701: N) or does not determine that the flags meet the conditions in step S702 (step S702: N), the control section 11 sets the template data (0) which indicates that none of the templates is a match in the match data (Match [C31]) (step S704), and terminates this processing.

Figure 14:
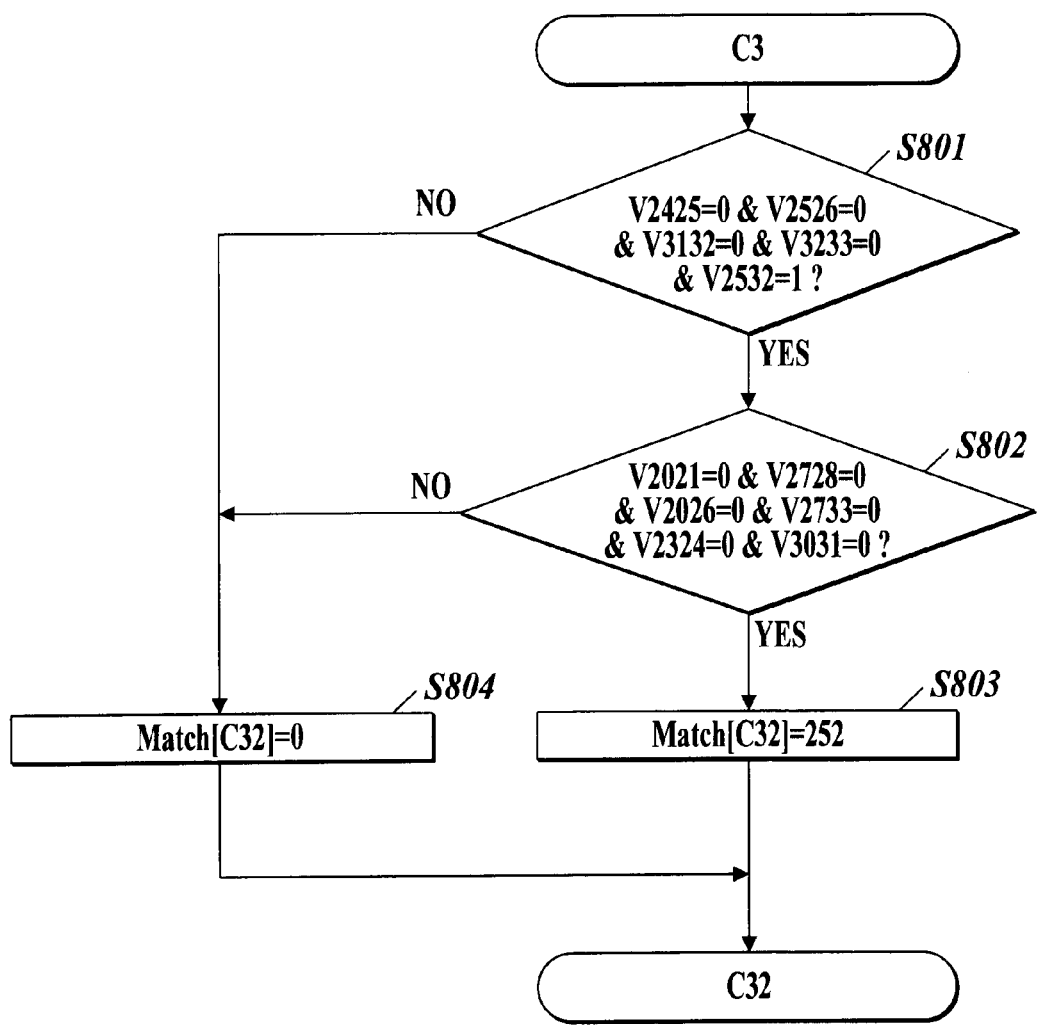
FIG. 14 is a flowchart which explains processing F.

Subsequently, processing F will be explained in detail with reference to FIG. 14.

First, the control section 11 determines whether the edge determination flag (V2425) is 0, the edge determination flag (V2526) is 0, the edge determination flag (V3132) is 0, the edge determination flag (V3233) is 0 and the edge determination flag (V2532) is 1 (step S801). When the control section 11 determines that the flags meet the conditions in step S801 (step S801: Y), the control section 11 determines whether the edge determination flag (V2021) is 0, the edge determination flag (V2728) is 0, the edge determination flag (V2026) is 0, the edge determination flag (V2733) is 0, the edge determination flag (V2324) is 0 and the edge determination flag (V3031) is 0 (step S802). When the control section 11 determines that the flags meet the conditions in step S802 (step S802: Y), the control section 11 sets template data (252) in match data (Match [C32]) in a predetermined storage area of the RAM11b (step S803), and terminates this processing. The template corresponding to the template data (252) is as shown in F of FIG. 5.

When the control section 11 does not determine that the flags meet the conditions in step S801 (step S801: N) or does not determine that the flags meet the conditions in step S802 (step S802: N), the control section 11 sets the template data (0) which indicates that none of the templates is a match in the match data (Match [C32]) (step S804), and terminates this processing.

Figure 15:
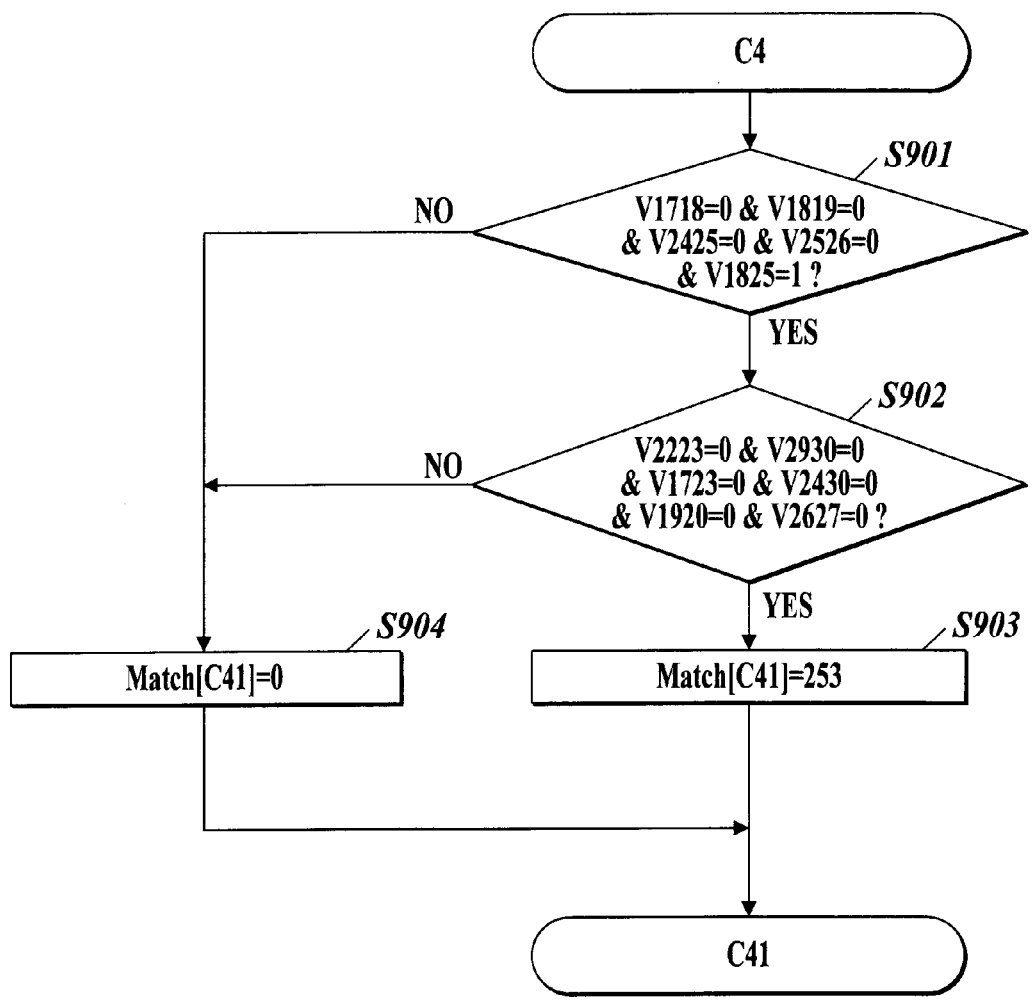
FIG. 15 is a flowchart which explains processing G.

Subsequently, processing G will be explained in detail with reference to FIG. 15.

First, the control section 11 determines whether the edge determination flag (V1718) is 0, the edge determination flag (V1819) is 0, the edge determination flag (V2425) is 0, the edge determination flag (V2526) is 0 and the edge determination flag (V1825) is 1 (step S901). When the control section 11 determines that the flags meet the conditions in step S901 (step S901: Y), the control section 11 determines whether the edge determination flag (V2223) is 0, the edge determination flag (V2930) is 0, the edge determination flag (V1723) is 0, the edge determination flag (V2430) is 0, the edge determination flag (V1920) is 0 and the edge determination flag (V2627) is 0 (step S902). When the control section 11 determines that the flags meet the conditions in step S902 (step S902: Y), the control section 11 sets template data (253) in match data (Match [C41]) in a predetermined storage area of the RAM11b (step S903), and terminates this processing. The template corresponding to the template data (253) is as shown in G of FIG. 5.

When the control section 11 does not determine that the flags meet the conditions in step S901 (step S901: N) or does not determine that the flags meet the conditions in step S902 (step S902: N), the control section 11 sets the template data (0) which indicates that none of the templates is a match in the match data (Match [C41]) (step S904), and terminates this processing.

Figure 16:
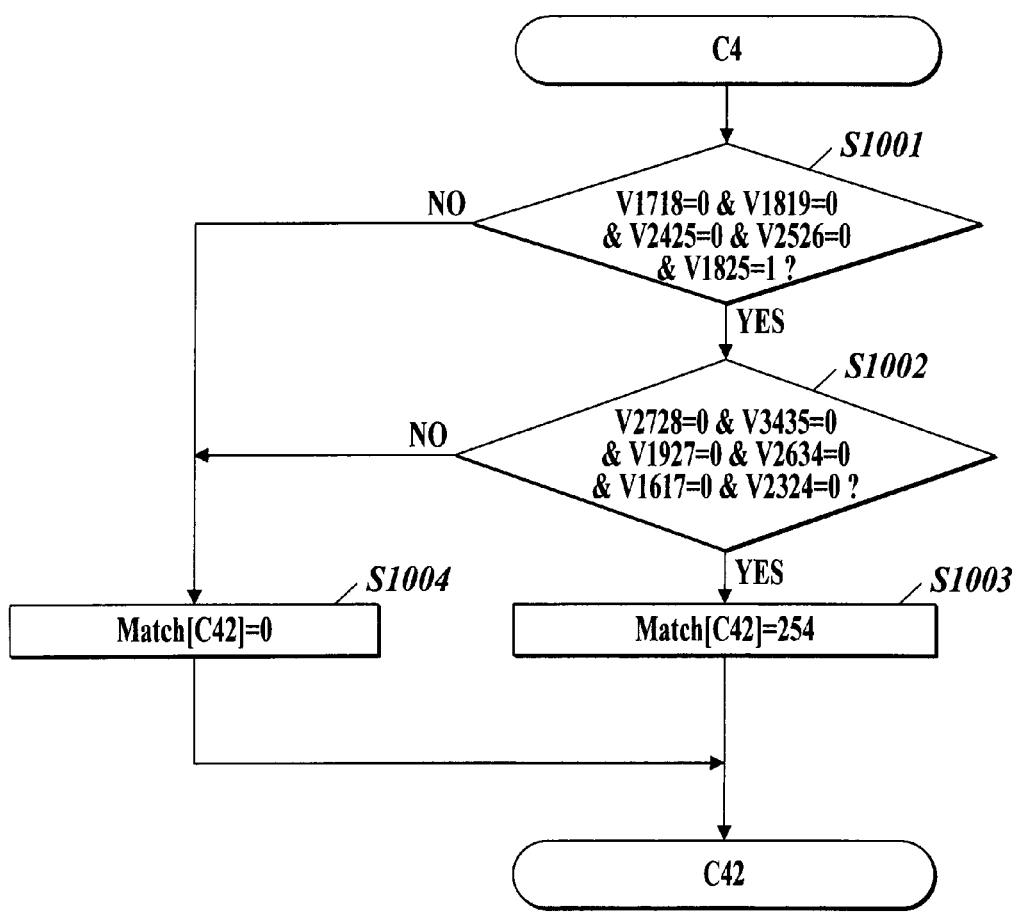
FIG. 16 is a flowchart which explains processing H.

Subsequently, processing H will be explained in detail with reference to FIG. 16.

First, the control section 11 determines whether the edge determination flag (V1718) is 0, the edge determination flag (V1819) is 0, the edge determination flag (V2425) is 0, the edge determination flag (V2526) is 0 and the edge determination flag (V1825) is 1 (step S1001). When the control section 11 determines that the flags meet the conditions in step S1001 (step S1001: Y), the control section 11 determines whether the edge determination flag (V2728) is 0, the edge determination flag (V3435) is 0, the edge determination flag (V1927) is 0, the edge determination flag (V2634) is 0, the edge determination flag (V1617) is 0 and the edge determination flag (V2324) is 0 (step S1002). When the control section 11 determines that the flags meet the conditions in step S1002 (step S1002: Y), the control section 11 sets template data (254) in match data (Match [C42]) in a predetermined storage area of the RAM11b (step S1003), and terminates this processing. The template corresponding to the template data (254) is as shown in H of FIG. 5.

When the control section 11 does not determine that the flags meet the conditions in step S1001 (step S1001: N) or does not determine that the flags meet the conditions in step S1002 (step S1002: N), the control section 11 sets the template data (0) which indicates that none of the templates is a match in the match data (Match [C42]) (step S1004), and terminates this processing.

Figure 17:
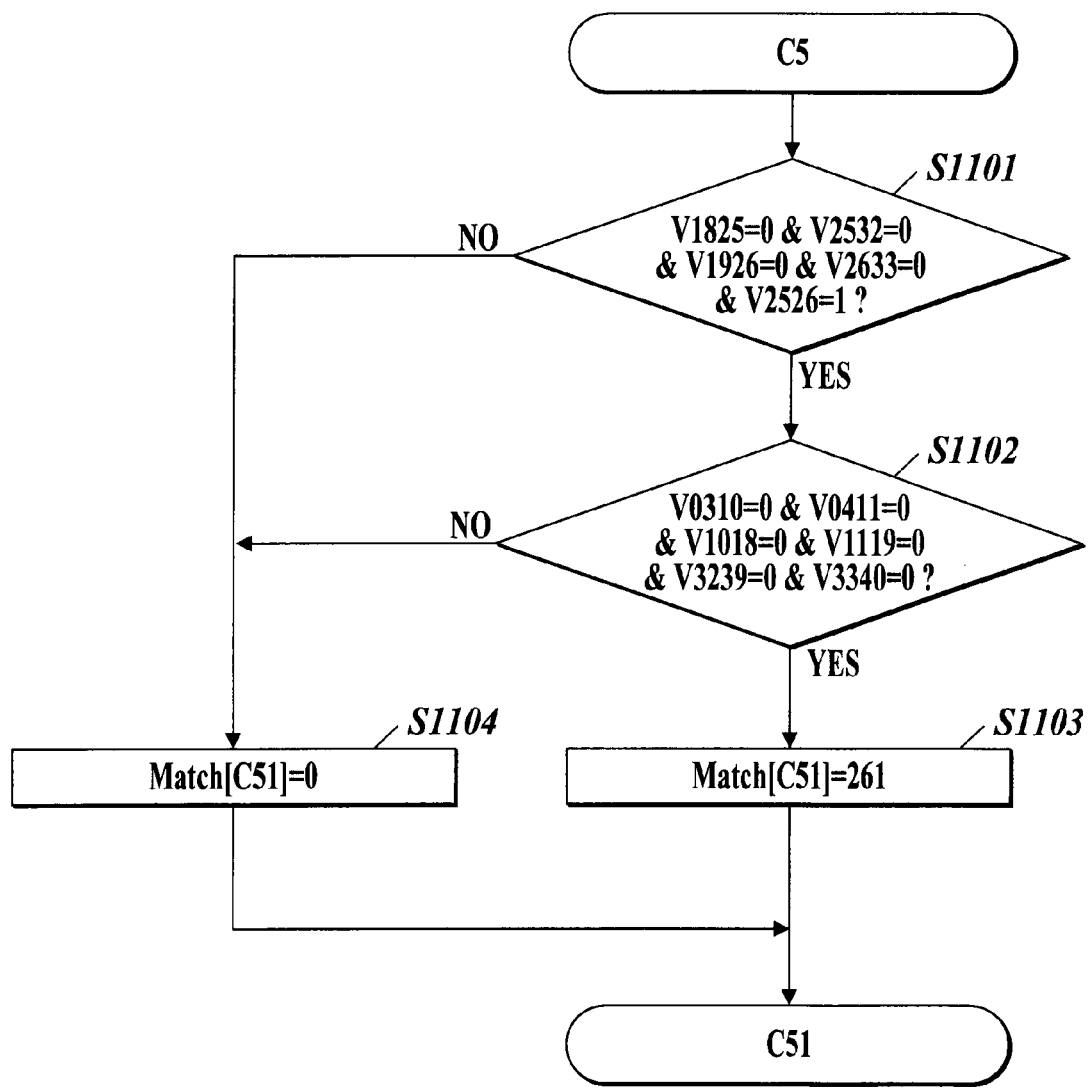
FIG. 17 is a flowchart which explains processing I.

Subsequently, processing I will be explained in detail with reference to FIG. 17.

First, the control section 11 determines whether the edge determination flag (V1825) is 0, the edge determination flag (V2532) is 0, the edge determination flag (V1926) is 0, the edge determination flag (V2633) is 0 and the edge determination flag (V2526) is 1 (step S1101). When the control section 11 determines that the flags meet the conditions in step S1101 (step S1101: Y), the control section 11 determines whether the edge determination flag (V0310) is 0, the edge determination flag (V0411) is 0, the edge determination flag (V1018) is 0, the edge determination flag (V1119) is 0, the edge determination flag (V3239) is 0 and the edge determination flag (V3340) is 0 (step S1102). When the control section 11 determines that the flags meet the conditions in step S1102 (step S1102: Y), the control section 11 sets template data (261) in match data (Match [C51]) in a predetermined storage area of the RAM11b (step S1103), and terminates this processing. The template corresponding to the template data (261) is as shown in M of FIG. 5.

When the control section 11 does not determine that the flags meet the conditions in step S1101 (step S1101: N) or does not determine that the flags meet the conditions in step S1102 (step S1102: N), the control section 11 sets the template data (0) which indicates that none of the templates is a match in the match data (Match [C51]) (step S1104), and terminates this processing.

Figure 18:
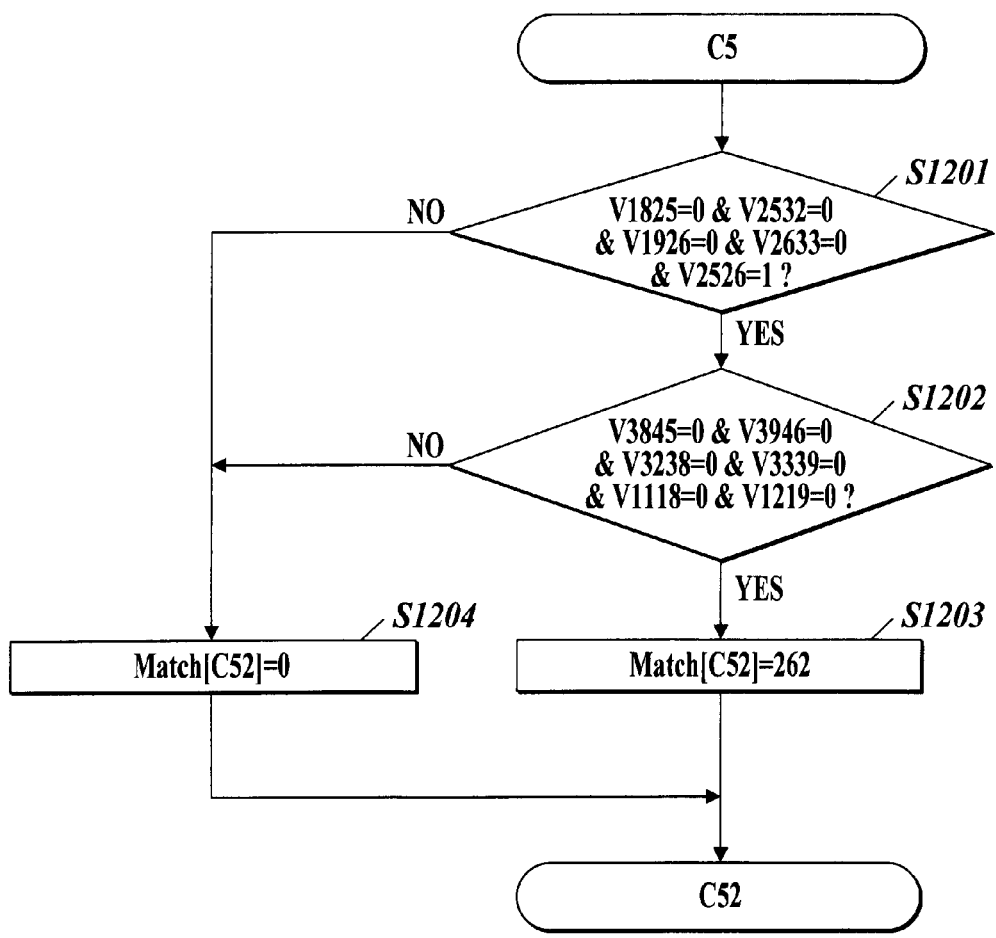
FIG. 18 is a flowchart which explains processing J.

Subsequently, processing J will be explained in detail with reference to FIG. 18.

First, the control section 11 determines whether the edge determination flag (V1825) is 0, the edge determination flag (V2532) is 0, the edge determination flag (V1926) is 0, the edge determination flag (V2633) is 0 and the edge determination flag (V2526) is 1 (step S1201). When the control section 11 determines that the flags meet the conditions in step S1201 (step S1201: Y), the control section 11 determines whether the edge determination flag (V3845) is 0, the edge determination flag (V3946) is 0, the edge determination flag (V3238) is 0, the edge determination flag (V3339) is 0, the edge determination flag (V1118) is 0 and the edge determination flag (V1219) is 0 (step S1202). When the control section 11 determines that the flags meet the conditions in step S1202 (step S1202: Y), the control section 11 sets template data (262) in match data (Match [C52]) in a predetermined storage area of the RAM11b (step S1203), and terminates this processing. The template corresponding to the template data (262) is as shown in N of FIG. 5.

When the control section 11 does not determine that the flags meet the conditions in step S1201 (step S1201: N) or does not determine that the flags meet the conditions in step S1202 (step S1202: N), the control section 11 sets the template data (0) which indicates that none of the templates is a match in the match data (Match [C52]) (step S1204), and terminates this processing.

Figure 19:
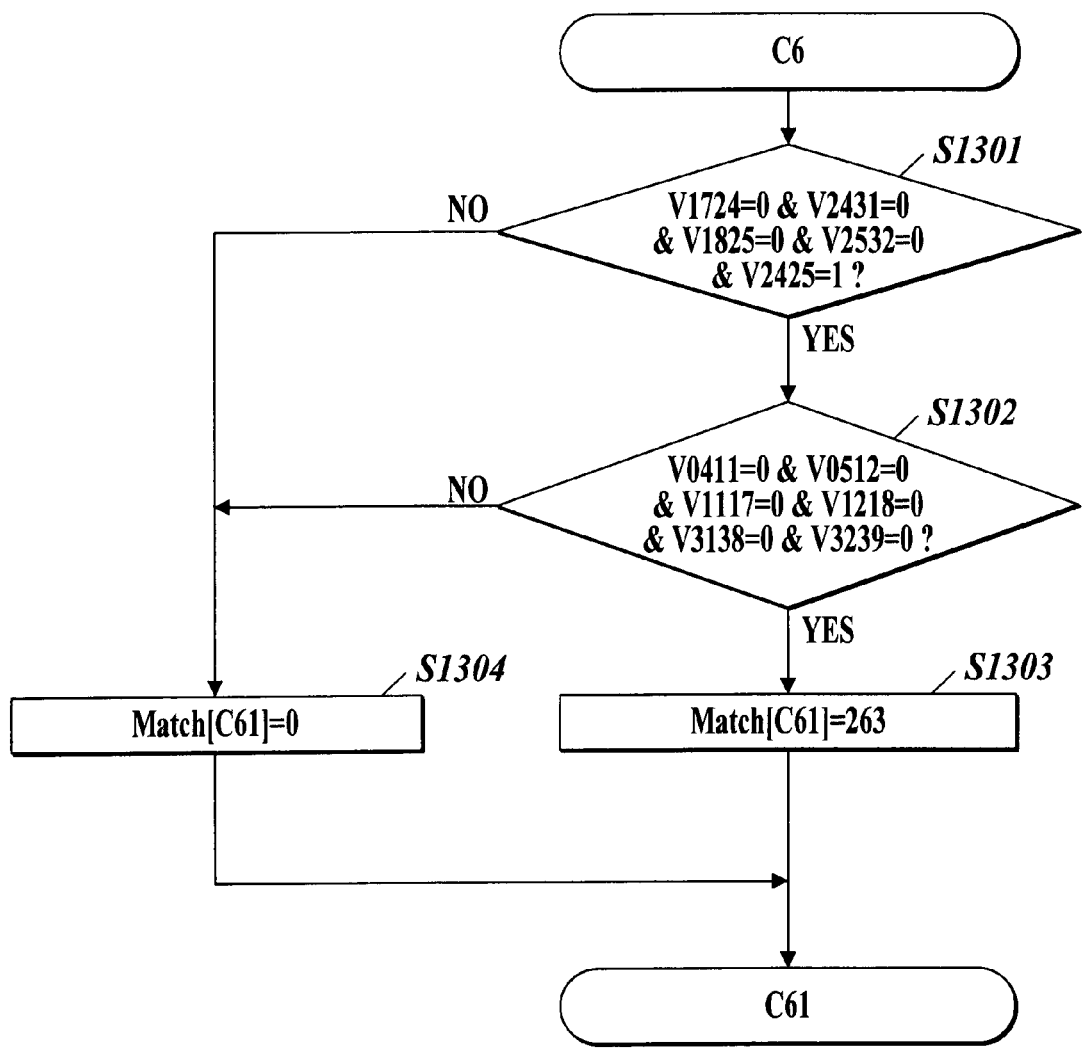
FIG. 19 is a flowchart which explains processing K.

Subsequently, processing K will be explained in detail with reference to FIG. 19.

First, the control section 11 determines whether the edge determination flag (V1724) is 0, the edge determination flag (V2431) is 0, the edge determination flag (V1825) is 0, the edge determination flag (V2532) is 0 and the edge determination flag (V2425) is 1 (step S1301). When the control section 11 determines that the flags meet the conditions in step S1301 (step S1301: Y), the control section 11 determines whether the edge determination flag (V0411) is 0, the edge determination flag (V0512) is 0, the edge determination flag (V1117) is 0, the edge determination flag (V1218) is 0, the edge determination flag (V3138) is 0 and the edge determination flag (V3239) is 0 (step S1302). When the control section 11 determines that the flags meet the conditions in step S1302 (step S1302: Y), the control section 11 sets template data (263) in match data (Match [C61]) in a predetermined storage area of the RAM11b (step S1303), and terminates this processing. The template corresponding to the template data (263) is as shown in O of FIG. 5.

When the control section 11 does not determine that the flags meet the conditions in step S1301 (step S1301: N) or does not determine that the flags meet the conditions in step S1302 (step S1302: N), the control section 11 sets the template data (0) which indicates that none of the templates is a match in the match data (Match [C61]) (step S1304), and terminates this processing.

Figure 20:
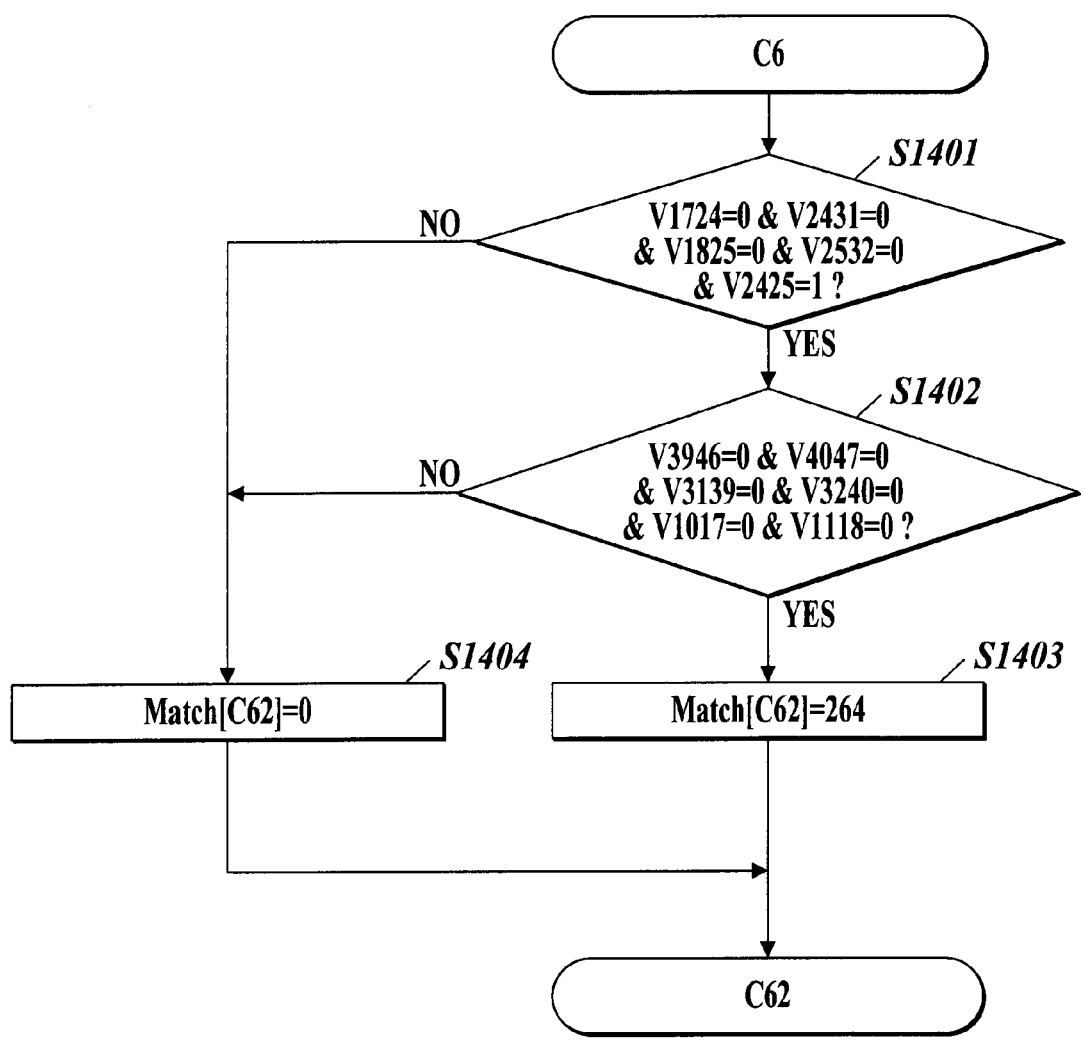
FIG. 20 is a flowchart which explains processing L.

Subsequently, processing L will be explained in detail with reference to FIG. 20.

First, the control section 11 determines whether the edge determination flag (V1724) is 0, the edge determination flag (V2431) is 0, the edge determination flag (V1825) is 0, the edge determination flag (V2532) is 0 and the edge determination flag (V2425) is 1 (step S1401). When the control section 11 determines that the flags meet the conditions in step S1401 (step S1401: Y), the control section 11 determines whether the edge determination flag (V3946) is 0, the edge determination flag (V4047) is 0, the edge determination flag (V3139) is 0, the edge determination flag (V3240) is 0, the edge determination flag (V1017) is 0 and the edge determination flag (V1118) is 0 (step S1402). When the control section 11 determines that the flags meet the conditions in step S1402 (step S1402: Y), the control section 11 sets template data (264) in match data (Match [C62]) in a predetermined storage area of the RAM11b (step S1403) and terminates this processing. The template corresponding to the template data (264) is as shown in P of FIG. 5.

When the control section 11 does not determine that the flags meet the conditions in step S1401 (step S1401: N) or does not determine that the flags meet the conditions in step S1402 (step S1402: N), the control section 11 sets the template data (0) which indicates that none of the templates is a match in the match data (Match [C62]) (step S1404), and terminates this processing.

Figure 21:
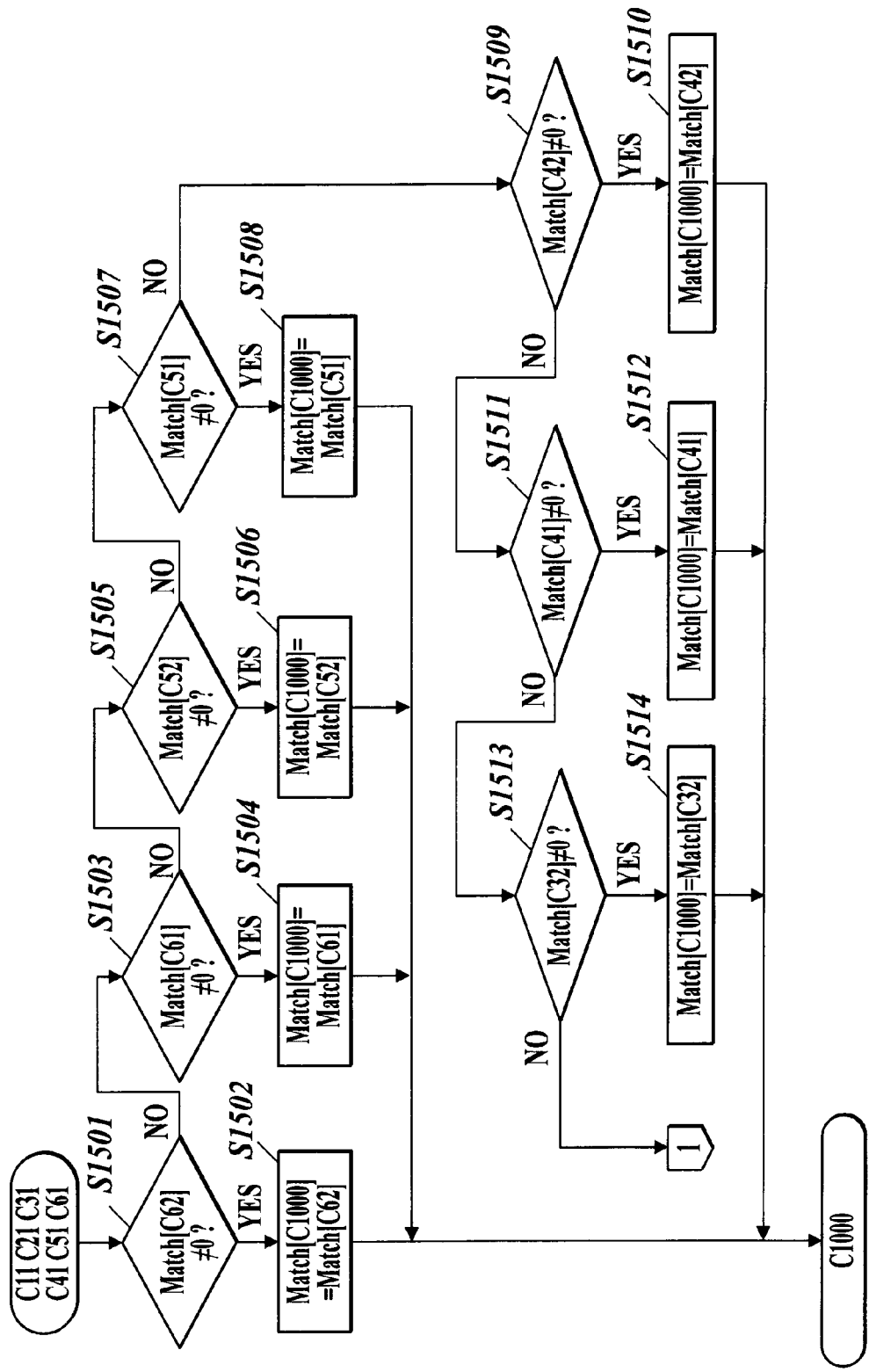
FIG. 21 is a flowchart which explains processing for selecting final template data.
Figure 22:
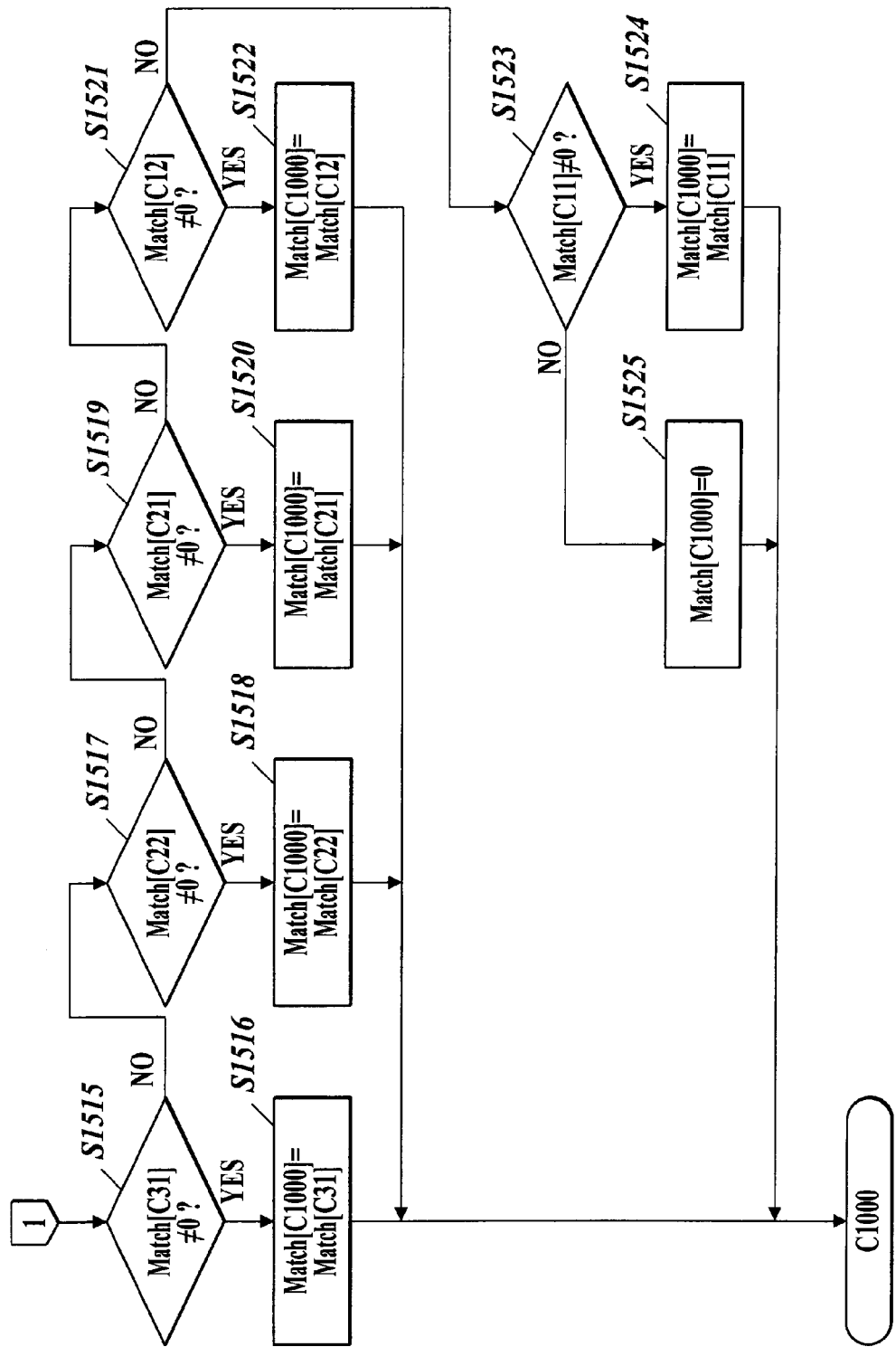
FIG. 22 is a flowchart which explains processing for selecting final template data.

Subsequently, processing to obtain the maximum value among template data values of C11, C12, C21, C22, C31, C32, C41, C42, C51, C52, C61 and C62 obtained by executing the above-mentioned processing A to L will be explained in detail with reference to FIGS. 21 and 22.

First, the control section 11 refers to the match data (Match [C62]), and determines whether data other than 0 is set in the match data (Match [C62]) (step S1501). That is, the control section 11 determines whether template data (264) is set in the match data (Match [C62]). When the control section 11 determines that data other than 0 is set in the match data (Match [C62]) (step S1501: Y), the control section 11 sets the template data which is set in the match data (Match [C62]) in match data (Match [C1000]) in a predetermined storage area of the RAM11b (step S1502), and terminates this processing.

On the other hand, when the control section 11 does not determine that data other than 0 is set in the match data (Match [C62]) (step S1501: N), the control section 11 refers to the match data (Match [C61]) and determines whether data other than 0 is set in the match data (Match [C61]) (step S1503). That is, the control section 11 determines whether template data (263) is set in the match data (Match [C61]).

When the control section 11 determines that data other than 0 is set in the match data (Match [C61]) (step S1503: Y), the control section 11 sets the template data which is set in the match data (Match [C61]) in the match data (Match [C1000]) in the predetermined storage area of the RAM11b (step S1504), and terminates this processing.

On the other hand, when the control section 11 does not determine that data other than 0 is set in the match data (Match [C61]) (step S1503: N), the control section 11 refers to the match data (Match [C52]) and determines whether data other than 0 is set in the match data (Match [C52]) (step S1505). That is, the control section 11 determines whether template data (262) is set in the match data (Match [C52]).

When the control section 11 determines that data other than 0 is set in the match data (Match [C52]) (step S1505: Y), the control section 11 sets the template data which is set in the match data (Match [C52]) in the match data (Match [C1000]) (step S1506), and terminates this processing.

On the other hand, when the control section 11 does not determine that data other than 0 is set in the match data (Match [C52]) (step S1505: N), the control section 11 refers to the match data (Match [C51]) and determines whether data other than 0 is set in the match data (Match [C51]) (step S1507). That is, the control section 11 determines whether template data (261) is set in the match data (Match [C51]).

When the control section 11 determines that data other than 0 is set in the match data (Match [C51]) (step S1507: Y), the control section 11 sets the template data which is set in the match data (Match [C51]) in the match data (Match [C1000]) (step S1508), and terminates this processing.

On the other hand, when the control section 11 does not determine that data other than 0 is set in the match data (Match [C51]) (step S1507: N), the control section 11 refers to the match data (Match [C42]) and determines whether data other than 0 is set in the match data (Match [C42]) (step S1509). That is, the control section 11 determines whether template data (254) is set in the match data (Match [C42]).

When the control section 11 determines that data other than 0 is set in the match data (Match [C42]) (step S1509: Y), the control section 11 sets the template data which is set in the match data (Match [C42]) in the match data (Match [C1000]) (step S1510), and terminates this processing.

On the other hand, when the control section 11 does not determine that data other than 0 is set in the match data (Match [C42]) (step S1509: N), the control section 11 refers to the match data (Match [C41]) and determines whether data other than 0 is set in the match data (Match [C41]) (step S1511). That is, the control section 11 determines whether template data (253) is set in the match data (Match [C41]).

When the control section 11 determines that data other than 0 is set in the match data (Match [C41]) (step S1511: Y), the control section 11 sets the template data which is set in the match data (Match [C41]) in the match data (Match [C1000]) (step S1512), and terminates this processing.

On the other hand, when the control section 11 does not determine that data other than 0 is set in the match data (Match [C41]) (step S1511: N), the control section 11 refers to the match data (Match [C32]) and determines whether data other than 0 is set in the match data (Match [C32]) (step S1513). That is, the control section 11 determines whether template data (252) is set in the match data (Match [C32]).

When the control section 11 determines that data other than 0 is set in the match data (Match [C32]) (step S1513: Y), the control section 11 sets the template data which is set in the match data (Match [C32]) in the match data (Match [C1000]) (step S1514), and terminates this processing.

On the other hand, when the control section 11 does not determine that data other than 0 is set in the match data (Match [C32]) (step S1513: N), the control section 11 refers to the match data (Match [C31]) as shown in FIG. 22 and determines whether data other than 0 is set in the match data (Match [C31]) (step S1515). That is, the control section 11 determines whether template data (251) is set in the match data (Match [C31]). When the control section 11 determines that data other than 0 is set in the match data (Match [C31]) (step S1515: Y), the control section 11 sets the template data which is set in the match data (Match [C31]) in the match data (Match [C1000]) (step S1516), and terminates this processing.

On the other hand, when the control section 11 does not determine that data other than 0 is set in the match data (Match [C31]) (step S1515: N), the control section 11 refers to the match data (Match [C22]) and determines whether data other than 0 is set in the match data (Match [C22]) (step S1517). That is, the control section 11 determines whether either of the template data (24) or the template data (243) is set in the match data (Match [C22]). When the control section 11 determines that data other than 0 is set in the match data (Match [C22]) (step S1517: Y), the control section 11 sets the template data which is set in the match data (Match [C22]) to the match data (Match [C1000]) (step S1518), and terminates this processing.

On the other hand, when the control section 11 does not determine that data other than 0 is set in the match data (Match [C22]) (step S1517: N), the control section 11 refers to the match data (Match [C21]) and determines whether data other than 0 is set in the match data (Match [C21]) (step S1519). That is, the control section 11 determines whether either of the template data (23) or the template data (233) is set in the match data (Match [C21]). When the control section 11 determines that data other than 0 is set in the match data (Match [C21]) (step S1519: Y), the control section 11 sets the template data which is set in the match data (Match [C21]) in the match data (Match [C1000]) (step S1520), and terminates this processing.

On the other hand, when the control section 11 does not determine that data other than 0 is set in the match data (Match [C21]) (step S1519: N), the control section 11 refers to the match data (Match [C12]) and determines whether data other than 0 is set in the match data (Match [C12]) (step S1521). That is, the control section 11 determines whether either of the template data (22) or the template data (223) is set in the match data (Match [C12]). When the control section 11 determines that data other than 0 is set in the match data (Match [C12]) (step S1521: Y), the control section 11 sets the template data which is set in the match data (Match [C12]) in the match data (Match [C1000]) (step S1522), and terminates this processing.

On the other hand, when the control section 11 does not determine that data other than 0 is set in the match data (Match [C12]) (step S1521: N), the control section 11 refers to the match data (Match [C11]) and determines whether data other than 0 is set in the match data (Match [C11]) (step S1523). That is, the control section 11 determines whether either of the template data (21) or the template data (213) is set in the match data (Match [C11]). When the control section 11 determines that data other than 0 is set in the match data (Match [C11]) (step S1523: Y), the control section 11 sets the template data which is set in the match data (Match [C11]) in the match data (Match [C1000]) (step S1524), and terminates this processing.

On the other hand, when the control section 11 does not determine that data other than 0 is set in the match data (Match [C11]) (step S1523: N), the control section 11 sets template data (0) which indicates that none of the templates is a match in the match data (Match [C1000]) (step S1525), and terminates this processing.

Final template data is specified eventually by executing the above processing. In this embodiment, a priority order is set for the template data corresponding to each template assuming a case where there are a plurality of matching templates. That is, by the above executed processing, each of template data is set to be selected in descending order of the numeral values indicated by the template data. Template data with larger number of pixels to be referred to is set to have higher priority. By setting template data in this manner, template data can be selected effectively. In this embodiment, template data are referred to for a matching template in descending order of the numeric values indicated by the template data. However, template data may be referred to in ascending order of the numeric values indicated by the template data.

In this embodiment, as mentioned above, it is possible to select template data with smaller number of edge determination flags to be referred to than the number of pixels being referred to for obtaining the edge determination flags in any case of template data selecting. Thus, the template data selection can be carried out with lesser amount of data.

Figure 23:
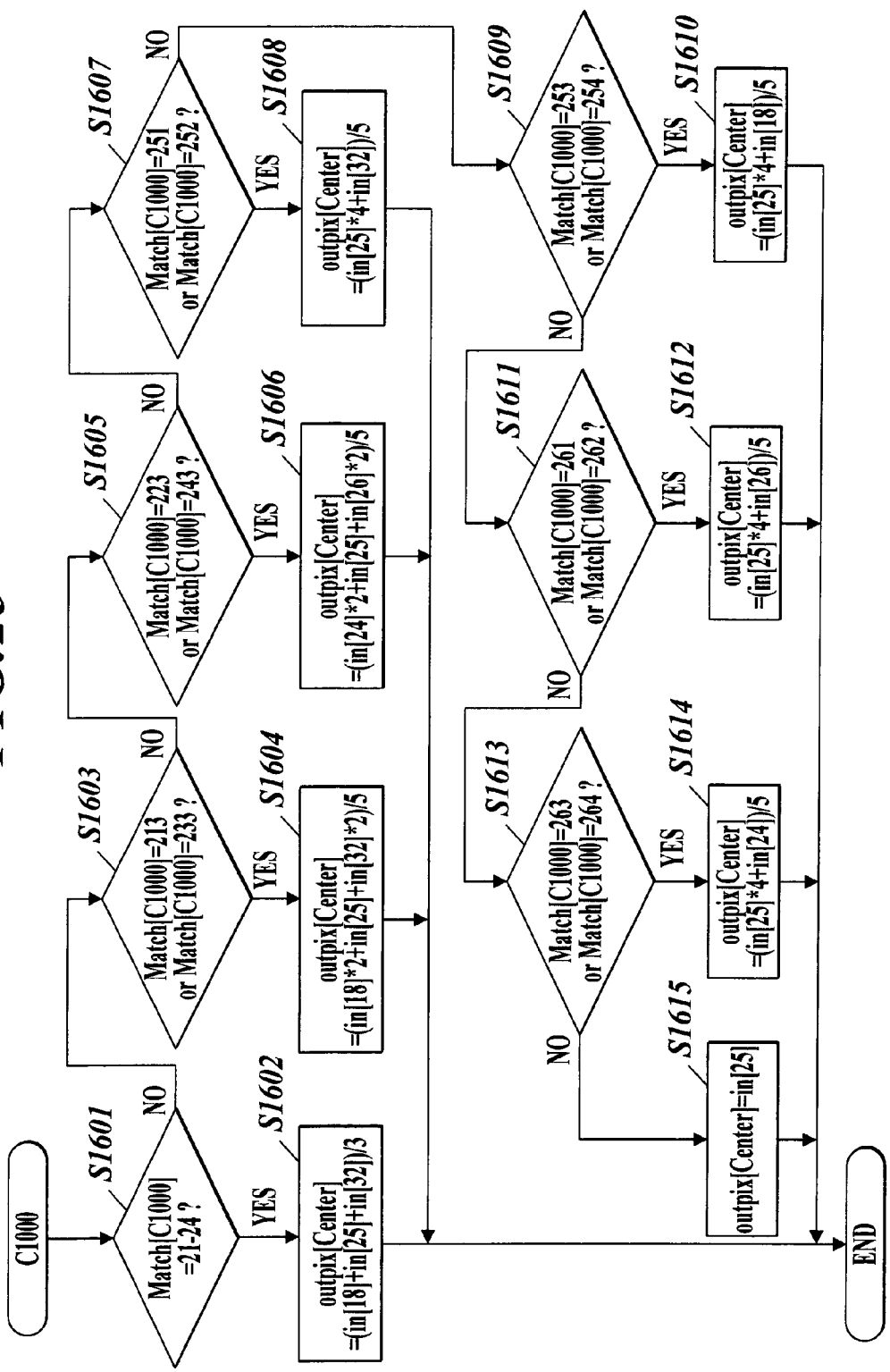
FIG. 23 is a flowchart which explains processing for calculating an output pixel value.

Subsequently, processing to calculate the output pixel value (Outpix [Center]) of the focused pixel P1 will be explained in detail with reference to FIG. 23.

First, the control section 11 refers to the match data (Match [C1000]) and determines whether the template data set in the match data (Match [C1000]) is any one of the template data (21) to template data (24) (step S1601). When the control section 11 determines that the template data set in the match data (Match [C1000]) is one of the template data (21) to template data (24) (step S1601: Y), the control section 11 calculates the sum of the pixel value (in [18]) of the pixel located in [18] (neighboring pixel P31), the pixel value (in [25]) of the pixel located in [25] (focused pixel P1) and the pixel value (in [32]) of the pixel located in [32] (neighboring pixel P32) and then, obtains a value which is one-third of the sum and sets the value as the output pixel value (Outpix [Center]) of the focused pixel P1 (step S1602), and terminates this processing.

On the other hand, when the control section 11 does not determine that the template data set in the match data (Match [C1000]) is any one of the template data (21) to template data (24) (step S1601: N), the control section 11 determines whether the template data set in the match data (Match [C1000]) is template data (213) or template data (233) (step S1603). When the control section 11 determines that the template data set in the match data (Match [C1000]) is template data (213) or template data (233) (step S1603: Y), the control section 11 calculates the sum of the twofold value of the pixel value (in [18]) of the pixel located in [18] (neighboring pixel P31), the pixel value (in [25]) of the pixel located in [25] (focused pixel P1) and the twofold value of the pixel value (in [32]) of the pixel located in [32] (neighboring pixel P32) and then, obtains a value which is one-fifth of the sum and sets the value as the output pixel value (Outpix [Center]) of the focused pixel P1 (step S1604), and terminates this processing.

On the other hand, when the control section 11 does not determine that the template data set in the match data (Match [C1000]) is template data (213) or template data (233) (step S1603: N), the control section 11 determines whether the template data set in the match data (Match [C1000]) is template data (223) or template data (243) (step S1605). When the control section 11 determines that the template data set in the match data (Match [C1000]) is template data (223) or template data (243) (step S1605: Y), the control section 11 calculates the sum of the twofold value of the pixel value (in [24]) of the pixel located in [24] (neighboring pixel P33), the pixel value (in [25]) of the pixel located in [25] (focused pixel P1) and the twofold value of the pixel value (in [26]) of the pixel located in [26] (neighboring pixel P34) and then, obtains a value which is one-fifth of the sum and sets the value as the output pixel value (Outpix [Center]) of the focused pixel P1 (step S1606), and terminates this processing.

On the other hand, when the control section 11 does not determine that the template data set in the match data (Match [C1000]) is template data (223) or template data (243) (step S1605: N), the control section 11 determines whether the template data set in the match data (Match [C1000]) is template data (251) or template data (252) (step S1607). When the control section 11 determines that template data set in the match data (Match [C1000]) is template data (251) or template data (252) (step S1607: Y), the control section 11 calculates the sum of the fourfold value of the pixel value (in [25]) of the pixel located in [25] (focused pixel P1) and the pixel value (in [32]) of the pixel located in [32] (neighboring pixel P32) and then, obtains a value which is one-fifth of the sum and sets the value as the output pixel value (Outpix [Center]) of the focused pixel P1 (step S1608), and terminates this processing.

On the other hand, when the control section 11 does not determine that the template data set in the match data (Match [C1000]) is template data (251) or template data (252) (step S1607: N), the control section 11 determines whether the template data set in the match data (Match [C1000]) is template data (253) or template data (254) (step S1609). When the control section 11 determines that the template data set in the match data (Match [C1000]) is template data (253) or template data (254) (step S1609: Y), the control section 11 calculates the sum of the fourfold value of the pixel value (in [25]) of the pixel located in [25] (focused pixel P1) and the pixel value (in [18]) of the pixel located in [18] (neighboring pixel P31) and then, obtains a value which is one-fifth of the sum and sets the value as the output pixel value (Outpix [Center]) of the focused pixel P1 (step S1610), and terminates this processing.

On the other hand, when the control section 11 does not determine that the template data set in the match data (Match [C1000]) is template data (253) or template data (254) (step S1609: N), the control section 11 determines whether the template data set in the match data (Match [C1000]) is template data (261) or template data (262) (step S1611). When the control section 11 determines that the template data set in the match data (Match [C1000]) is template data (261) or template data (262) (step S1611: Y), the control section 11 calculates the sum of the fourfold value of the pixel value (in [25]) of the pixel located in [25] (focused pixel P1) and the pixel value (in [26]) of the pixel located in [26] (neighboring pixel P34) and then, obtains a value which is one-fifth of the sum and sets the value as the output pixel value (Outpix [Center]) of the focused pixel P1 (step S1612), and terminates this processing.

On the other hand, when the control section 11 does not determine that the template data set in the match data (Match [C1000]) is template data (261) or template data (262) (step S1611: N), the control section 11 determines whether the template data set in the match data (Match [C1000]) is template data (263) or template data (264) (step S1613). When the control section 11 determines that the template data set in the match data (Match [C1000]) is template data (263) or template data (264) (step S1613: Y), the control section 11 calculates the sum of the fourfold value of the pixel value (in [25]) of the pixel located in [25] (focused pixel P1) and the pixel value (in [24]) of the pixel located in [24] (neighboring pixel P33) and then, obtains a value which is one-fifth of the sum and sets the value as the output pixel value (Outpix [Center]) of the focused pixel P1 (step S1614), and terminates this processing.

On the other hand, when the control section 11 does not determine that the template data set in the match data (Match [C1000]) is template data (263) or template data (264) (step S1613: N), the control section 11 sets the pixel value (in [25]) of the pixel located in [25] (focused pixel P1) as the output pixel value (Outpix [Center]) of the focused pixel P1 as it is (step S1615), and terminates this processing.

In this embodiment, by executing the above processing, the output pixel value of the focused pixel P1 can be calculated by a calculation method according to the selected template data. In this embodiment, the pixel value of the focused pixel and the pixel values of the surrounding pixels are combined in specific proportions to obtain the output pixel value in a method different from the conventional method which is the anti-aliasing assuming binary input values. Therefore, a processing result close to the resolution conversion can be obtained.

After the output value conversion processing is executed in the above described manner, the control section 11 determines whether the processing of steps S102 and S103 is carried for all the pixels in the input image data (step S104). When the control section 11 determines that the processing is completed for all the pixels (step S104: Y), the control section 11 terminates this processing. On the other hand, when the control section 11 does not determine that the processing is completed from all the pixels (step S104: N), the control section 11 shifts the edge determination flags so that the flag values of the edge determination flags (VAB) held in the edge determination flag storage region respectively shift to the left direction (step S105), and proceeds to the processing of step S101. That is, the control section 11 shifts the flag value of the edge determination flag (V0411) to the flag value of the edge determination flag (V0310) and shifts the flag value of the edge determination flag (V0512) to the flag value of the edge determination flag (V0411). Further, the control section 11 shifts the flag value of the edge determination flag (V1118) to the flag value of the edge determination flag (V1017) and shifts the flag value of the edge determination flag (V1219) to the flag value of the edge determination flag (V1118). Furthermore, the control section 11 shifts the flag value of the edge determination flag (V1119) to the flag value of the edge determination flag (V1018) and shifts the flag value of the edge determination flag (V1218) to the flag value of the edge determination flag (V1117). Moreover, the control section 11 shifts the flag value of the edge determination flag (V1617) to the flag value of the edge determination flag (V1516), shifts the flag value of the edge determination flag (V1718) to the flag value of the edge determination flag (V1617), shifts the flag value of the edge determination flag (V1819) to the flag value of the edge determination flag (V1718), shifts the flag value of the edge determination flag (V1920) to the flag value of the edge determination flag (V1819), and shifts the flag value of the edge determination flag (V2021) to the flag value of the edge determination flag (V1920). Further, the control section 11 shifts the flag value of the edge determination flag (V1826) to the flag value of the edge determination flag (V1624) and shifts the flag value of the edge determination flag (V1927) to the flag value of the edge determination flag (V1826). Furthermore, the control section 11 shifts the flag value of the edge determination flag (V1824) to the flag value of the edge determination flag (V1723) and shifts the flag value of the edge determination flag (V2026) to the flag value of the edge determination flag (V1824). Moreover, the control section 11 shifts the flag value of the edge determination flag (V1825) to the flag value of the edge determination flag (V1724) and shifts the flag value of the edge determination flag (V1926) to the flag value of the edge determination flag (V1825). Further, the control section 11 shifts the flag value of the edge determination flag (V2324) to the flag value of the edge determination flag (V2223), shifts the flag value of the edge determination flag (V2425) to the flag value of the edge determination flag (V2324), shifts the flag value of the edge determination flag (V2526) to the flag value of the edge determination flag (V2425), shifts the flag value of the edge determination flag (V2627) to the flag value of the edge determination flag (V2526), and shifts the flag value of the edge determination flag (V2728) to the flag value of the edge determination flag (V2627). Furthermore, the control section 11 shifts the flag value of the edge determination flag (V2432) to the flag value of the edge determination flag (V2331) and shifts the flag value of the edge determination flag (V2634) to the flag value of the edge determination flag (V2432). Moreover, the control section 11 shifts the flag value of the edge determination flag (V2632) to the flag value of the edge determination flag (V2430) and shifts the flag value of the edge determination flag (V2733) to the flag value of the edge determination flag (V2632). Further, the control section 11 shifts the flag value of the edge determination flag (V2532) to the flag value of the edge determination flag (V2431) and shifts the flag value of the edge determination flag (V2633) to the flag value of the edge determination flag (V2532). Furthermore, the control section 11 shifts the flag value of the edge determination flag (V3031) to the flag value of the edge determination flag (2930), shifts the flag value of the edge determination flag (V3132) to the flag value of the edge determination flag (V3031), shifts the flag value of the edge determination flag (V3233) to the flag value of the edge determination flag (V3132), shifts the flag value of the edge determination flag (V3334) to the flag value of the edge determination flag (V3233), and shifts the flag value of the edge determination flag (V3435) to the flag value of the edge determination flag (V3334). Moreover, the control section 11 shifts the flag value of the edge determination flag (V3239) to the flag value of the edge determination flag (V3138) and shifts the flag value of the edge determination flag (V3340) to the flag value of the edge determination flag (V3239). Further, the control section 11 shifts the flag value of the edge determination flag (V3240) to the flag value of the edge determination flag (V3139) and shifts the flag value of the edge determination flag (V3339) to the flag value of the edge determination flag (V3238). Furthermore, the control section 11 shifts the flag value of the edge determination flag (V3946) to the flag value of the edge determination flag (V3845) and shifts the flag value of the edge determination flag (V4047) to the flag value of the edge determination flag (V3946).

In this embodiment, by shifting the edge determination flags in the manner as described above, the edge determination flags can be used again in the edge determination processing of the image data in the viewing window W which is to be set next. In such way, the edge determination result of one pixel combination can be used for maximum of six times. Therefore, there is no need to carry out edge determinations for all the above mentioned 56 pixel combinations, and a template can be specified by practically carrying out minimum of 17 times of edge determinations in one edge determination processing. Thus, efficiency of the processing can be improved.

Next, the results of the anti-aliasing processing which is realized by the image processing section 10 configured as described above will be explained with reference to FIGS. 24 and 25.

Figure 24:
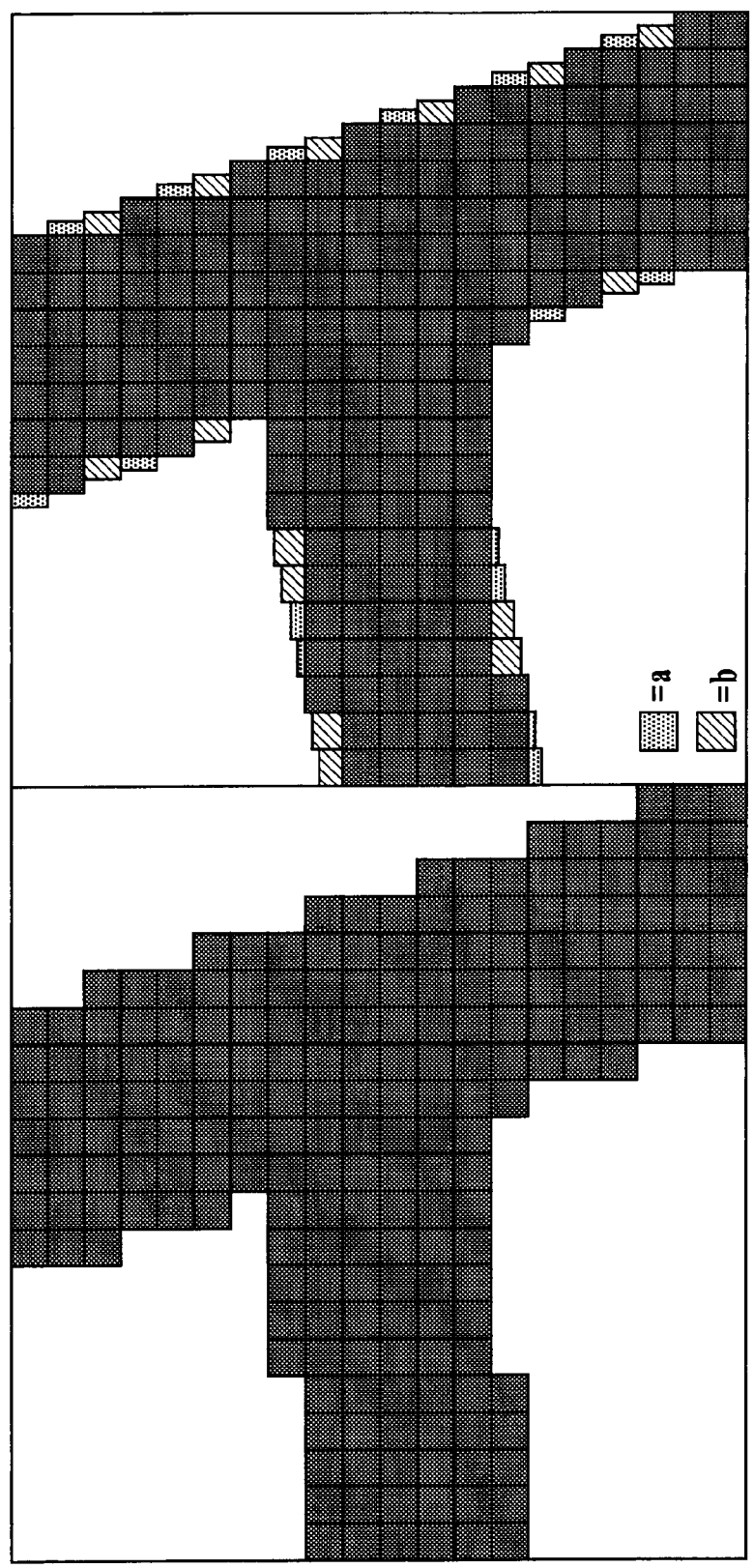
FIGS. 24A and 24B are diagrams which explain a result of the anti-aliasing of the embodiment.
Figure 25:
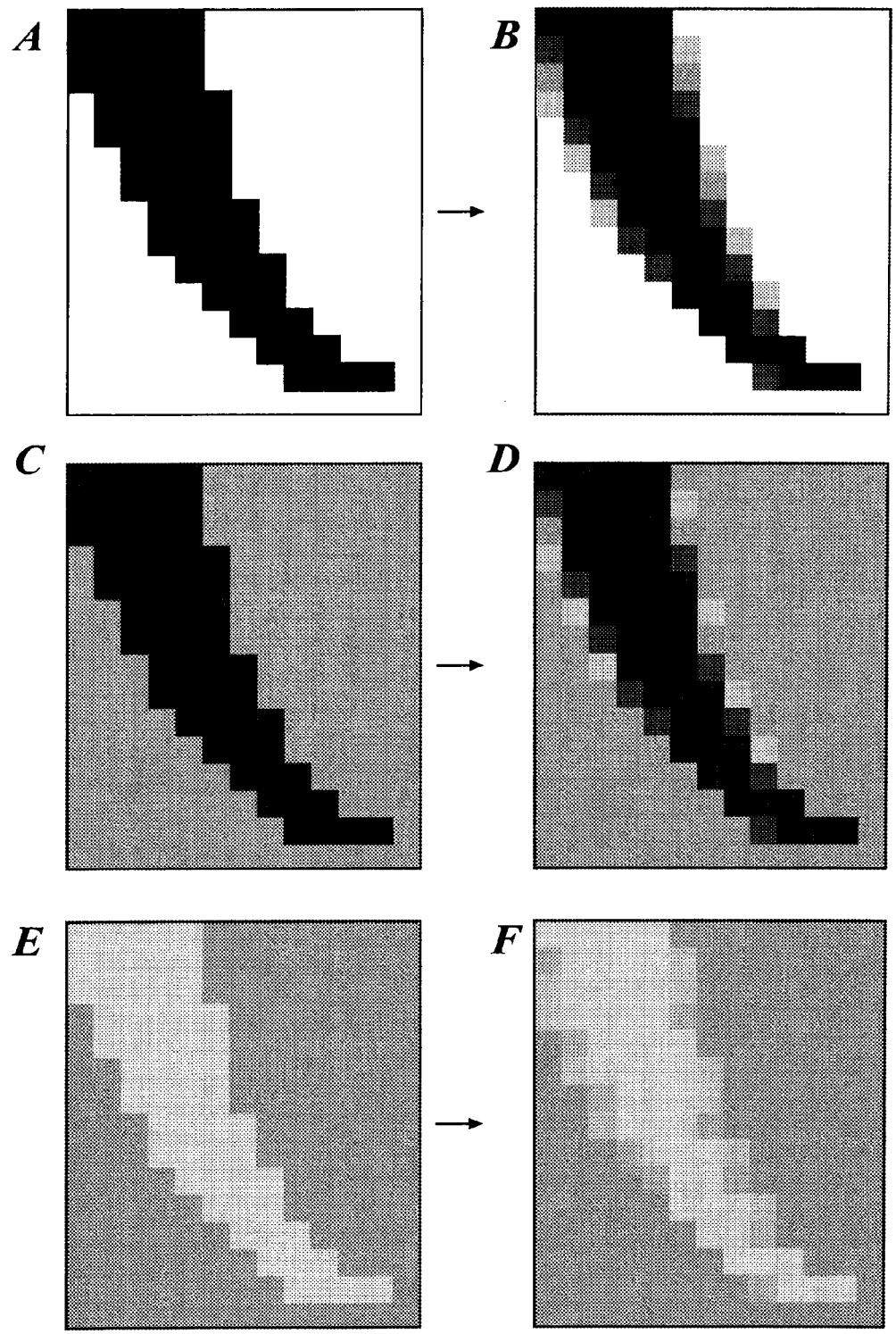
FIGS. 25A to 25F are diagrams which explain results of the anti-aliasing of the embodiment.

FIG. 24 is an enlarged diagram of a part of a character to which the anti-aliasing processing according to this embodiment is performed. Further, FIG. 25 is a character to which the anti-aliasing processing according to this embodiment is performed, and this is an enlarged diagram of a part of a character having different aspect than the character shown in FIG. 24.

FIG. 24A is an image before the anti-aliasing processing is performed, and FIG. 24B is an image after the anti-aliasing processing was performed. In the diagrams, the pixels shown in pattern "a" are the pixels which constitute the background before the anti-aliasing processing was performed, and they indicate that smoothing was performed between those pixels and the adjacent pixels thereof which constitute the character. Further, in the diagrams, the pixels shown in pattern "b" are the pixels constitute the character before the anti-aliasing processing was performed, and they indicate that smoothing was performed between those pixels and the adjacent pixels thereof which constitute the background.

As shown in FIG. 24B, jaggies can be eliminated effectively in this embodiment by specifying predetermined pixels on the border of the character and the background in a template-wise edge determination and performing the anti-aliasing processing in the manner as described above.

FIG. 25A is an image before the anti-aliasing processing is performed, and FIG. 25B is an image after the anti-aliasing processing was performed. In the example shown in FIGS. 25A and 25B, the background image is white, and a character is expressed in solid black color. With respect to such image, the smoothing effect similar to the conventional techniques can be obtained in this embodiment as shown in FIG. 25B.

FIG. 25C is an image similar to the image shown in FIG. 25A, except the background and the character are expressed in halftone. Further, FIG. 25E is also an image similar to the image shown in FIG. 25A, except the difference in gradation between the background and the character is smaller than that in FIG. 25C.

As shown in FIGS. 25D and 25F, the anti-aliasing processing can be performed to a halftone image in this embodiment by appropriately setting the threshold value to carry out edge determinations according to the content of the image.

As described above, in this embodiment, whether an edge exists or not is detected based on differences in pixel values of neighboring two pixels and pattern matching for selecting a template based on the result of the edge detections is carried out. Then, by taking a weighted average of original pixel values of maximum of five pixels among a focused pixel and neighboring pixels of the focused pixel which are adjacent to the focus pixel in four sides (above, below, left and right) based on the result of pattern matching, the pixel value of the focused pixel after the anti-aliasing processing is performed is obtained. Therefore, in this embodiment, the anti-aliasing processing can be performed even when the pixels values of the pixels constituting the character or background have variety of values including halftone.

Moreover, according to the edge detection processing in this embodiment, pattern matching can be carried out with lesser amount of calculation and lesser amount of data comparing to the conventional edge detection method. Thus, an overall calculation cost can be reduced. Further, according to this embodiment, by holding the results of edge detections for a plurality of times of anti-aliasing processing and by reusing the results, the average amount of calculation in one anti-aliasing processing can also be reduced. Furthermore, when realizing the edge detection processing of this embodiment in a hardware configuration, the edge detection can be realized with simpler configuration.

For example, in a conventional pattern matching technique, edge detection with Laplacian or Sobel operator needs to be performed to a total of 12 pixels in the first region and the second region in order to specify the template shown in E of FIG. 5. In the edge detection using Lapacian, addition/subtraction needs to be executed for 108 times (9×12=108) because addition/subtraction is performed between nine pixels, which are a focused pixel and pixels surrounding the focused pixel. Furthermore, in the edge detection using Sobel operator, addition/subtraction needs to be executed between six pixels around the focused pixel in X axis direction and Y axis direction and Euclidean distance needs to be obtained from the calculation results. Therefore, in the edge detection with Sobel operation, addition/subtraction needs to be executed for at least 144 times (6×2×12=144) and also, multiplication needs to be executed for 2 times, addition needs to be executed for 1 time and square root calculation needs to be executed for 1 time in order to calculate the Euclidean distance.

On the other hand, a template can be specified with only 11 times of addition/subtraction between pixels in this embodiment.

As described above, according to this embodiment, the viewing window setting section 102 sets the viewing window W of a predetermined size (7×7 pixels) including a focused pixel P1. Then, the edge determination section 103 extracts a plurality of combinations of two predetermined pixels adjacent to each other in the viewing window W set by the viewing window setting section 102. Thereafter, the edge determination section 103 determines the difference between the input pixel values of the two pixels which are extracted for each combination. Further, the template matching section 104 obtains template data based on the combinations of the determination results obtained by the edge determination section 103. Then, the pixel value calculation section 105 performs a weighted addition on the input pixel value of the focused pixel P1 and the input pixel values of the predetermined neighboring pixels P31 to P34 which are adjacent to the focused pixel P1 based on the template data obtained by the template matching section 104. As a result, the amount of calculation and the amount of data for edge detection can be reduced. Thus, anti-aliasing processing which brings out a great smoothing effect by reducing the processing load can be performed. Further, the anti-aliasing can also be performed on a halftone image with reduced processing load.

Moreover, according to this embodiment, the template matching section 104 obtains template data with lesser number of edge determination flags to be referred to for obtaining the template data, the edge determination flags being obtained by the edge determination section 103, than the number of pixels to be referred to for obtaining the edge determination flags. As a result, selection of template data can be carried out by suppressing the amount of data.

Moreover, according to this embodiment, the RAM 11b stores the edge determination flags obtained by the edge determination section 103. The viewing window setting section 102 sets the viewing window W so that the focused pixel P1 be located at a preset position and changes the setting position of the viewing window W every time an output pixel value is obtained so that the pixel which is to be the focused pixel P1 is to be selected in a predetermined order. Then, the template matching section 104 obtains template data by referring to at least a portion of the edge determination flags stored in the RAM 11b. As a result, the amount of processing for performing edge detections can be reduced and efficiency in the processing can be improved.

Here, the description of the embodiment according to the preset invention is an example of the MFP according to the present invention and the preset invention is not limited to the above described example. The detail configuration and detail operation of each functional section constituting the MFP can be changed appropriately as needed. Further, the present invention can be applied to any computer apparatus other than MFP as long as the computer apparatus performs image processing.

Moreover, as described above with reference to FIG. 8, edge determination flags are respectively input in C1 to C6 and processing is carried out to respectively obtain template data matching the edge determination flags from C11, C12, C21, C22, C31, C32, C41, C42, C51, C52, C61 and C62, and then, the template data indicating the maximum value is selected among the template data in this embodiment. However, the processing can be optimized by reducing the routines as described below.

Figure 26:
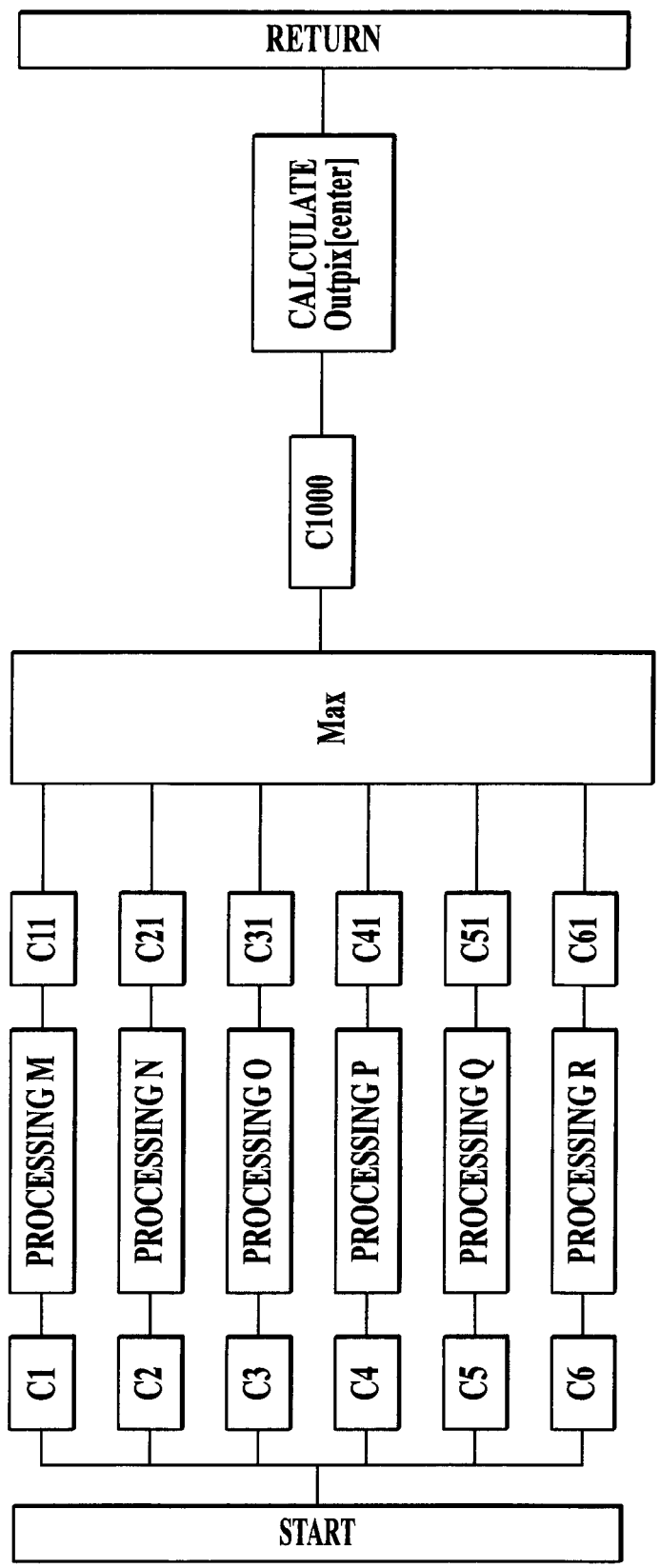
FIG. 26 is a diagram which explains an outline of another example of the output value conversion processing.

That is, as shown in FIG. 26, the control section 11 respectively inputs edge determination flags in C1 to C6 and sequentially executes the processing (processing M to processing R) to obtain template data which match the edge determination flags from C11 to C61, respectively. Then, the control section 11 inputs the maximum value among the values indicated by the template data respectively obtained from C11 to C61. The control section 11 calculates and outputs the output pixel value (Outpix [Center]) of the focused pixel P1 based on the template data which is input to C1000.

Figure 27:
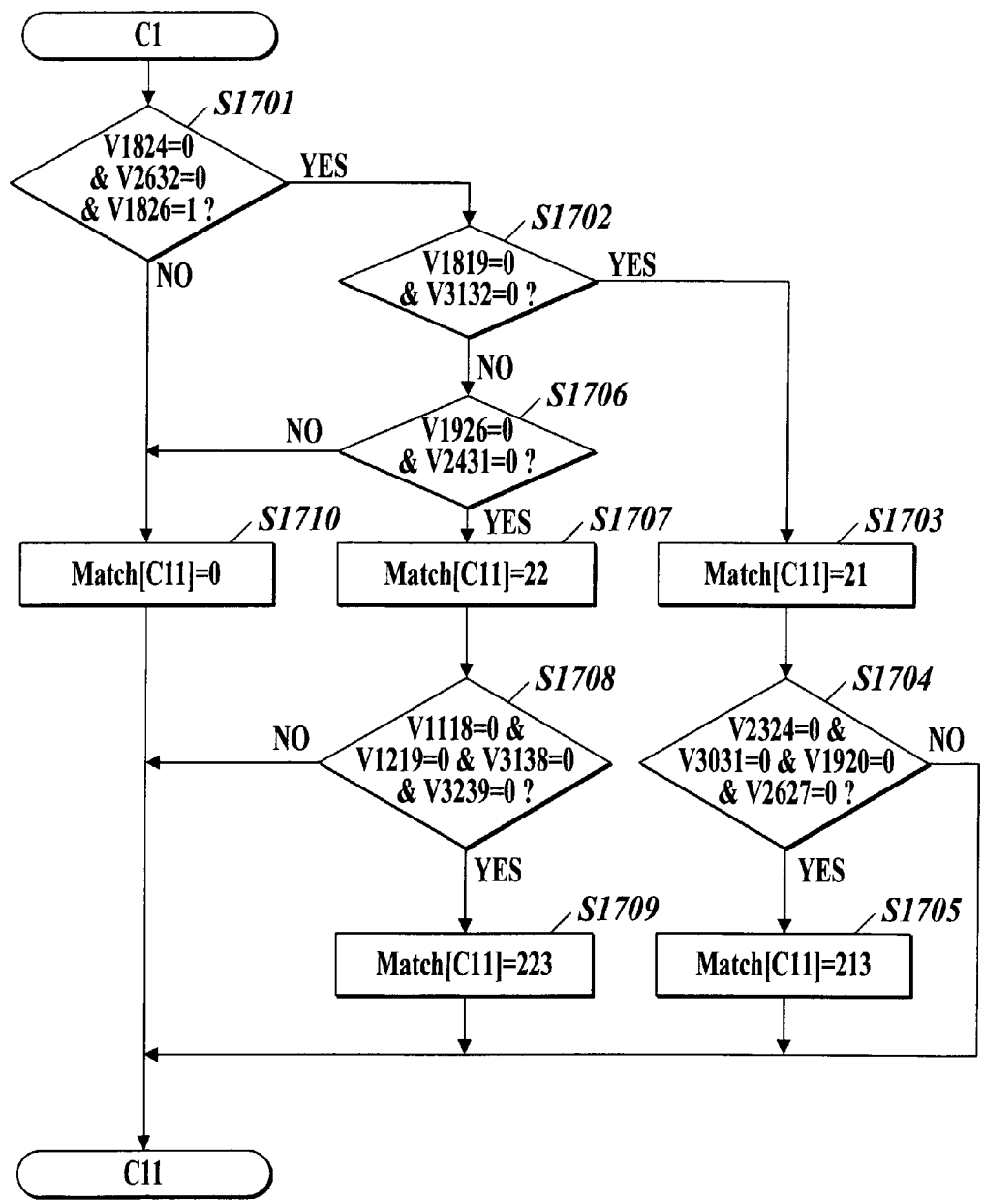
FIG. 27 is a flowchart which explains processing M.

Here, processing M will be explained in detail with reference to FIG. 27. The processing M is the optimized processing in which the above described processing A and processing B are combined.

First, the control section 11 determines whether the edge determination flag (V1824) is 0, the edge determination flag (V2632) is 0 and the edge determination flag (V1826) is 1 (step S1701). When the control section 11 determines that the conditions in step S1701 are met (step S1701: Y), the control section 11 determines whether the edge determination flag (V1819) is 0 and the edge determination flag (V3132) is 0 (step S1702). When the control section 11 determines that the conditions in step 1702 are met (step S1702: Y), the control section 11 sets template data (21) in the match data (Match [C11]) (step S1703). Then, the control section 11 determines whether the edge determination flag (V2324) is 0, the edge determination flag (V3031) is 0, the edge determination flag (V1920) is 0 and the edge determination flag (V2627) is 0 (step S1704). When the control section 11 determines that the conditions in step S1704 are met (step S1704: Y), the control section 11 changes the data which is set in the match data (Match [C11]) to template data (213) (step S1705), and terminates this processing. On the other hand, when the control section 11 does not determine that the conditions in step S1704 are met (step S1704: N), the control section 11 terminates this processing without executing the processing of step S1705.

Moreover, when the control section 11 does not determine that the condition in step S1702 are met in step S1702 (step S1702: N), the control section 11 determines whether the edge determination flag (V1926) is 0 and the edge determination flag (V2431) is 0 (step S1706). When the control section 11 determines that the conditions in step S1706 are met (step S1706: Y), the control section 11 sets template data (22) in the match data (Match [C11]) (step S1707). Then, the control section 11 determines whether the edge determination flag (V1118) is 0, the edge determination flag (V1219) is 0, the edge determination flag (V3138) is 0 and the edge determination flag (V3239) is 0 (step S1708). When the control section 11 determines that the conditions in step S1708 are met (step S1708: Y), the control section 11 changes the data which is set in the match data (Match [C11]) to template data (223) (step S1709), and terminates this processing. On the other hand, when the control section 11 does not determine that the conditions in step S1708 are met (step S1708: N), the control section terminates this processing without executing the processing of step S1709.

Moreover, when the control section 11 does not determine that the conditions in step S1701 are met (step S1701: N) or when the control section 11 does not determine that the conditions in step S1706 are met (step S1706: N), the control section 11 sets the template data (0) which indicates that none of the templates is a match in the match data (Match [C11]) (step S1710) and terminates this processing.

Figure 28:
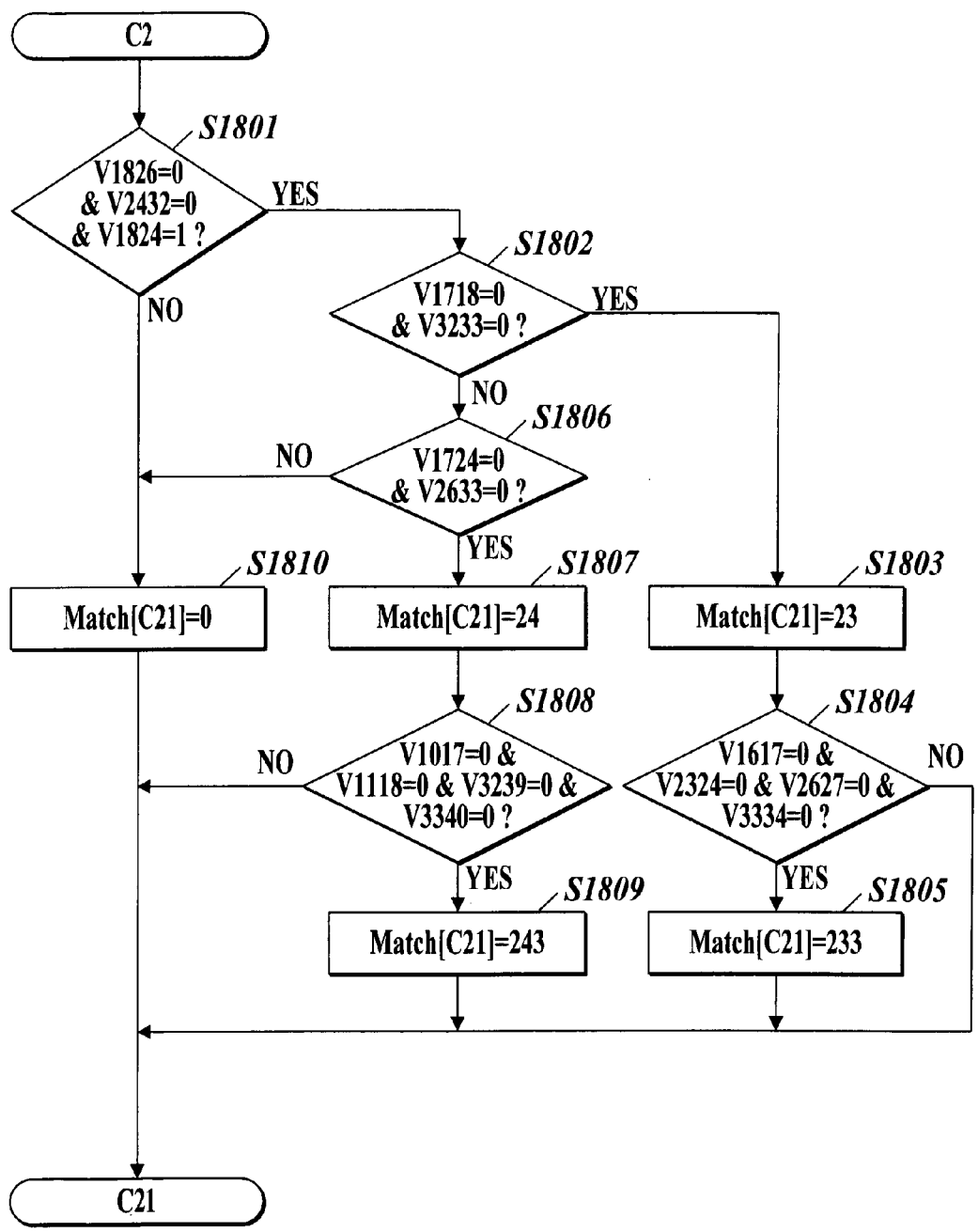
FIG. 28 is a flowchart which explains processing O.

Next, processing N will be explained in detail with reference to FIG. 28. The processing N is the optimized processing in which the above described processing C and processing D are combined.

First, the control section 11 determines whether the edge determination flag (V1826) is 0, the edge determination flag (V2432) is 0 and the edge determination flag (V1824) is 1 (step S1801). When the control section 11 determines that the conditions in step S1801 are met (step S1801: Y), the control section 11 determines whether the edge determination flag (V1718) is 0 and the edge determination flag (V3233) is 0 (step S1802). When the control section 11 determines that the conditions in step S1802 are met (step s1802: Y), the control section 11 sets template data (23) in the match data (Match [C21]) (step S1803). Then, the control section 11 determines whether the edge determination flag (V1617) is 0, the edge determination flag (V2324) is 0, the edge determination flag (V2627) is 0 and the edge determination flag (V3334) is 0 (step S1804). When the control section 11 determines that the conditions in step S1804 are met (step S1804: Y), the control section changes the data which is set in the match data (Match [C21]) to template data (233) (step S1805) and terminates this processing. On the other hand, when to control section 11 does not determine that the conditions in step S1804 are met (step S1804: N), the control section 11 terminates this processing without executing the processing of step S1805.

Moreover, when the control section 11 does not determine that that the conditions in step S1802 are met (step S1802: N) in step S1802, the control section 11 determines whether the edge determination flag (V1724) in 0 and the edge determination flag (V2633) is 0 (step S1806). When the control section 11 determines that the conditions in step S1806 are met (step S1806: Y), the control section sets template data (24) in the match data (Match [C21]) (step S1807). Then, the control section 11 determines whether the edge determination flag (V1017) is 0, the edge determination flag (V1118) is 0, the edge determination flag (V3239) is 0 and the edge determination flag (V3340) is 0 (step S1808). When the control section 11 determines that the conditions in step S1808 are met (step S1808: Y), the control section changes the data which is set in the match data (Match [C21]) to template data (243) (step S1809) and terminates the processing. On the other hand, when the control section 11 does not determine that the conditions in step S1808 are met (step S1808: N), the control section terminates this processing without executing the processing of step S1809.

Moreover, when the control section 11 does not determine that the condition in step S1801 are met (step S1801: N) or when the control section 11 does not determine that the conditions in step S1806 are met (step S1806: N), the control section 11 sets the template data (0) which indicates that none of the templates is a match in the match data (Match [C21]) (step S1810) and terminates the processing.

Figure 29:
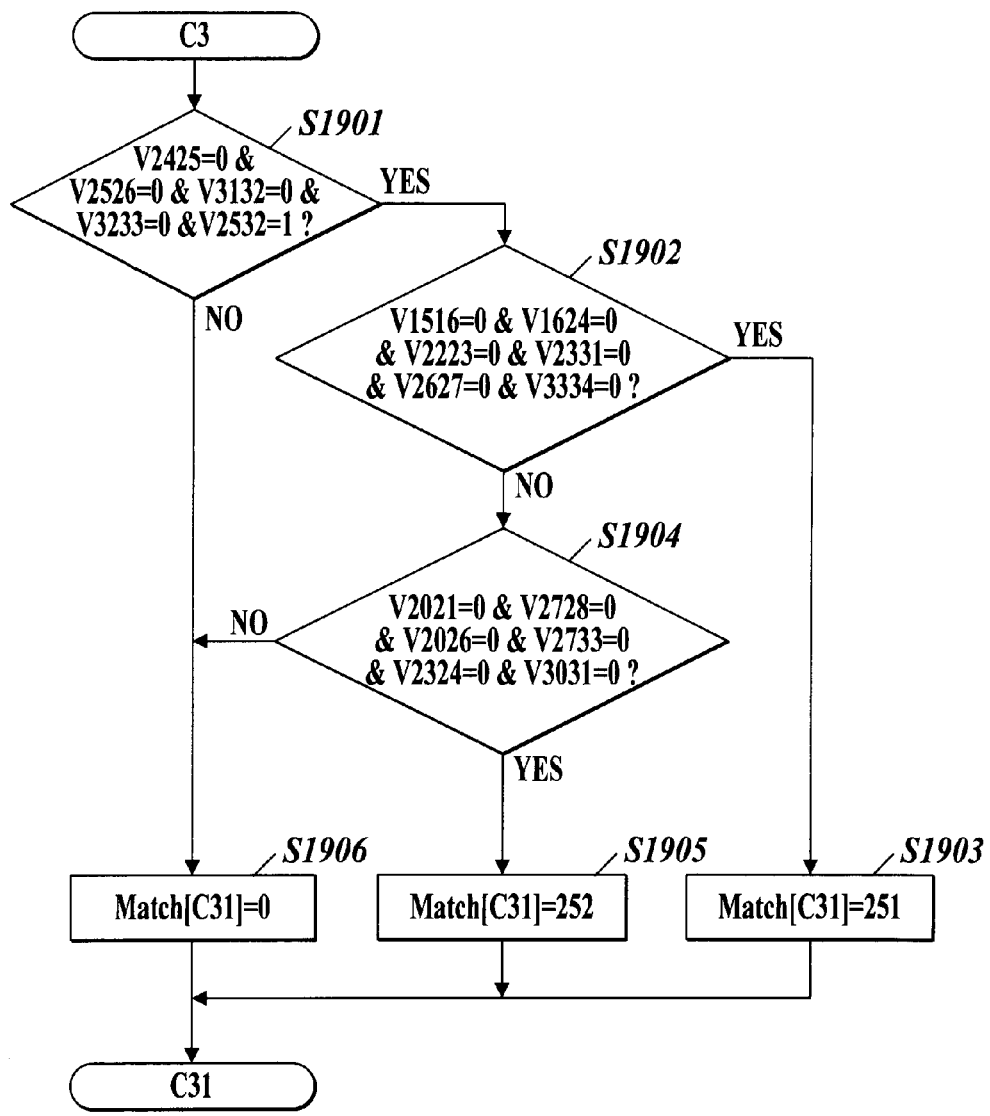
FIG. 29 is a flowchart which explains processing P.

Next, processing O will be explained in detail with reference to FIG. 29. The processing O is the optimized processing in which the above described processing E and processing F are combined.

First, the control section 11 determines whether the edge determination flag (V2425) is 0, the edge determination flag (V2526) is 0, the edge determination flag (V3132) is 0, the edge determination flag (V3233) is 0 and the edge determination flag (V2532) is 1 (step S1901). When the control section 11 determines that the conditions in step S1901 are met (step S1901: Y), the control section determines whether the edge determination flag (V1516) is 0, the edge determination flag (V1624) is 0, the edge determination flag (V2223) is 0, the edge determination flag (V2331) is 0, the edge determination flag (V2627) is 0 and the edge determination flag (V3334) is 0 (step S1902). When the control section 11 determines that the conditions in step S1902 are met (step S1902: Y), the control section 11 sets template data (251) in the match data (Match [C31]) (step S1903) and terminates this processing.

On the other hand, when the control section 11 does not determine that the conditions in step S1902 are met (step S1902: N), the control section 11 determines whether the edge determination flag (V2021) is 0, the edge determination flag (V2728) is 0, the edge determination flag (V2026) is 0, the edge determination flag (V2733) is 0, the edge determination flag (V2324) is 0 and the edge determination flag (V3031) is 0 (step S1904). When the control section 11 determines that the conditions in step S1904 are met (step S1904: Y), the control section 11 sets template data (252) in the match data (Match [C31]) (step S1905) and terminates this processing.

Moreover, when the control section 11 does not determine that the conditions in step S1901 are met (step S1901: N) or when the control section 11 does not determine that the conditions in step S1904 are met (step S1904: N), the control section 11 sets the template data (0) which indicates that none of the templates is a match in the match data (Match [C31]) (step S1906) and terminates this processing.

Figure 30:
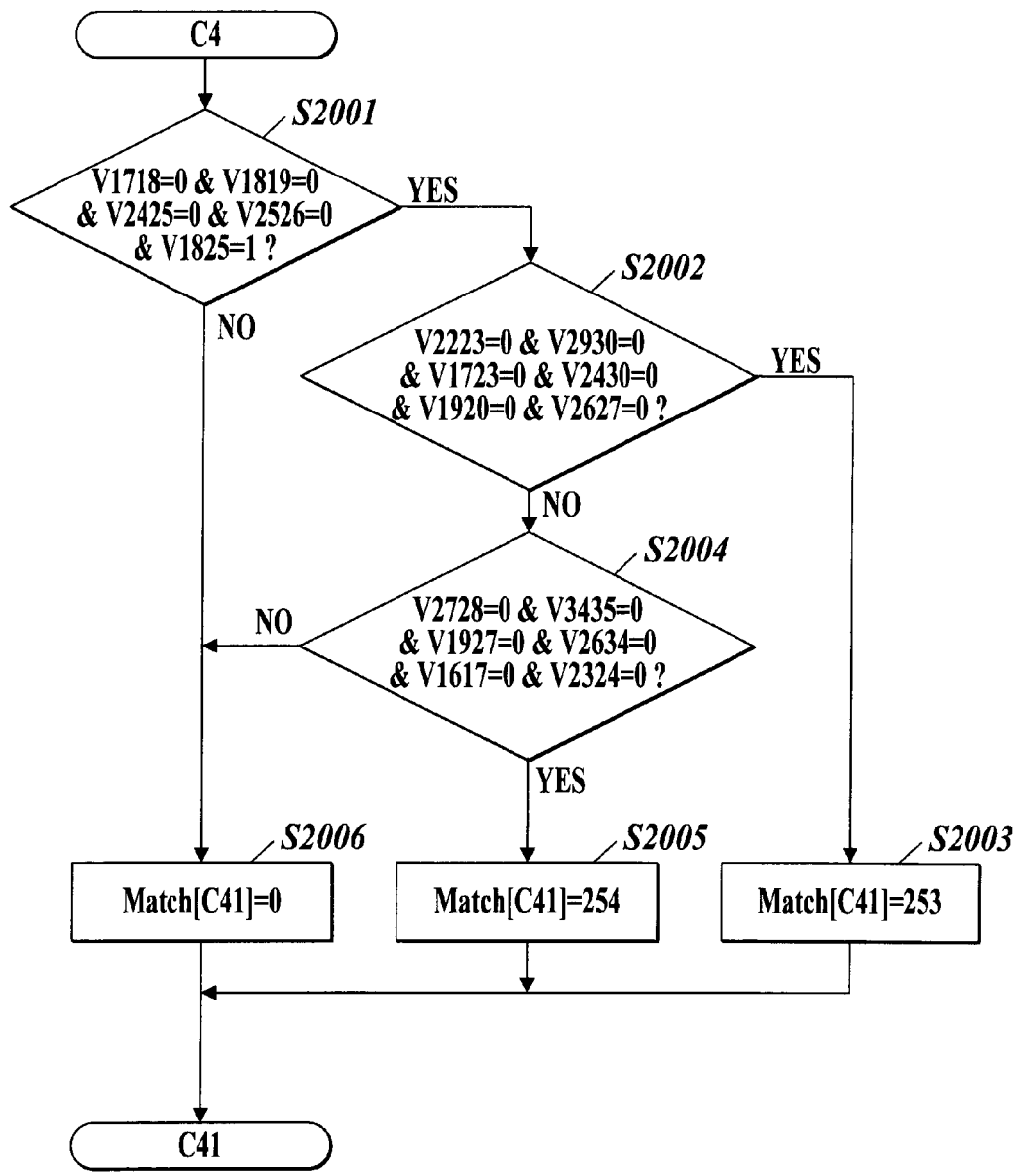
FIG. 30 is a flowchart which explains processing Q.

Next, processing P will be explained in detail with reference to FIG. 30. The processing P is the optimized processing in which the above described processing G and processing H are combined.

First, the control section 11 determines whether the edge determination flag (V1718) is 0, the edge determination flag (V1819) is 0, the edge determination flag (V2425) is 0, the edge determination flag (V2526) is 0 and the edge determination flag (V1825) is 1 (step S2001). When the control section 11 determines that the conditions in step S2001 are met (step S2001: Y), the control section 11 determines whether the edge determination flag (V2223) is 0, the edge determination flag (V2930) is 0, the edge determination flag (V1723) is 0, the edge determination flag (V2430) is 0, the edge determination flag (V1920) is 0 and the edge determination flag (V2627) is 0 (step S2002). When the control section 11 determines that the conditions in step S2002 are met (step S2002: Y), the control section 11 sets template data (253) in the match data (Match [C41]) (step S2003) and terminates this processing.

On the other hand, when the control section 11 does not determine that the conditions in step S2002 are met (step S2002: N), the control section 11 determines whether the edge determination flag (V2728) is 0, the edge determination flag (V3435) is 0, the edge determination flag (V1927) is 0, the edge determination flag (V2634) is 0, the edge determination flag (V1617) is 0 and the edge determination flag (V2324) is 0 (step S2004). When the control section 11 determines that the conditions in step S2004 are met (step S2004: Y), the control section 11 sets template data (254) in the match data (Match [C41]) (step S2005) and terminates this processing.

Further, when the control section 11 does not determine that the conditions in step S2011 are met (step S2001: N) or when the control section 11 does not determine that the conditions in step S2004 are met (step S2004: N), the control section 11 sets the template data (0) which indicates that none of the templates is a match in the match data (Match [C41]) (step S2006) and terminates this processing.

Figure 31:
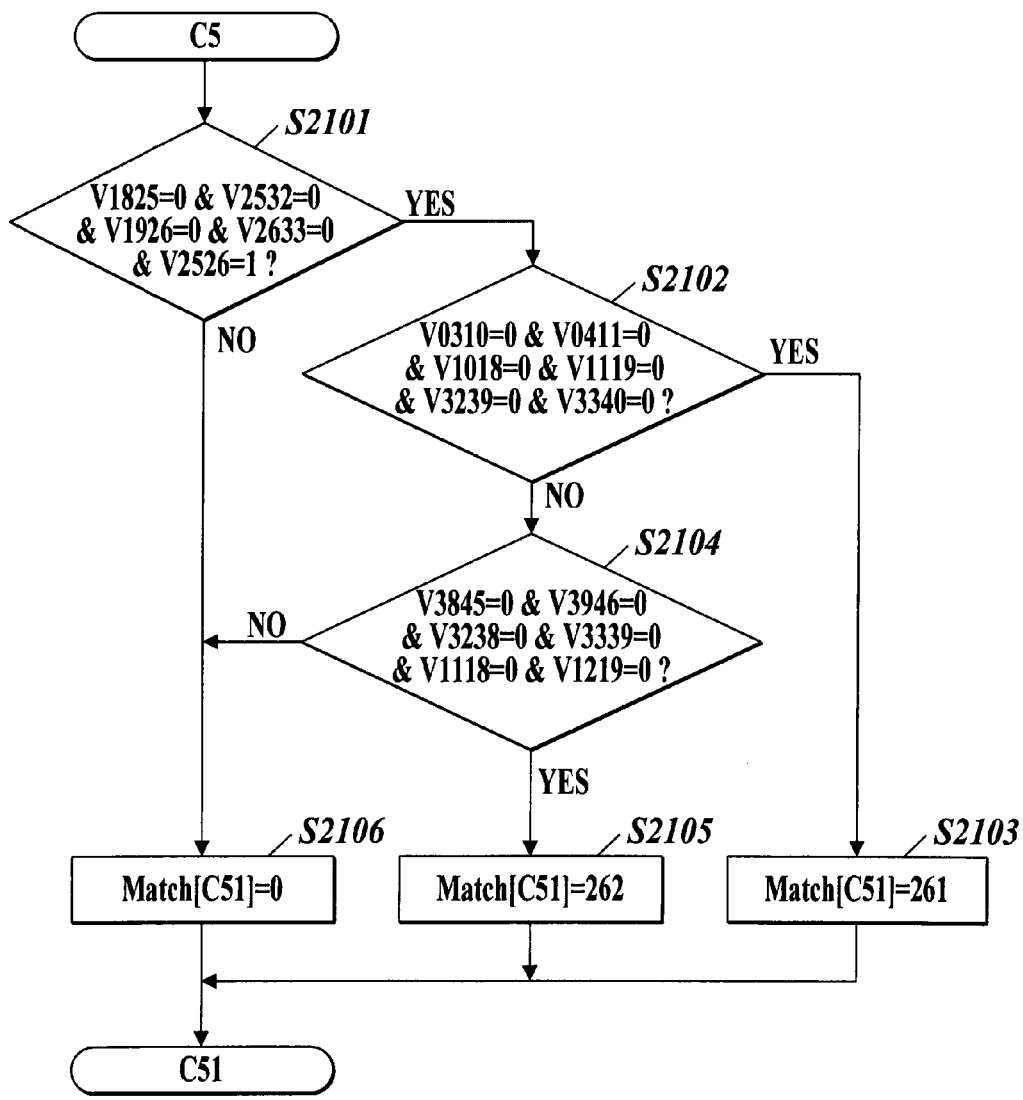
FIG. 31 is a flowchart which explains processing R.

Moreover, processing Q will be explained in detail with reference to FIG. 31. The processing Q is optimized processing in which the above described processing I and processing J are combined.

First, the control section 11 determines whether the edge determination flag (V1825) is 0, the edge determination flag (V2532) is 0, the edge determination flag (V1926) is 0, the edge determination flag (V2633) is 0 and the edge determination flag (V2526) is 1 (step S2101). When the control section 11 determines that the conditions in step S2101 are met (step S2101: Y), the control section 11 determines whether the edge determination flag (V0310) is 0, the edge determination flag (V0411) is 0, the edge determination flag (V1018) is 0, the edge determination flag (V1119) is 0, the edge determination flag (V3239) is 0 and the edge determination flag (V3340) is 0 (step S2102). When the control section 11 determines that the conditions in step S2102 are met (step S2102: Y), the control section 11 sets template data (261) in the match data (Match [C51]) (step S2103) and terminates this processing.

On the other hand, when the control section 11 does not determine that the conditions in step S2102 are met (step S2102: N), the control section 11 determination whether the edge determination flag (V3845) is 0, the edge determination flag (V3946) is 0, the edge determination flag (V3238) is 0, the edge determination flag (V3339) is 0, the edge determination flag (V1118) is 0 and the edge determination flag (V1219) is 0 (step S2104). When the control section 11 determines that the conditions in step S2104 are met (step S2104: Y), the control section 11 sets template data (262) in the match data (Match [C51]) (step S2105) and terminates the processing.

Moreover, when the control section 11 does not determine that the conditions in step S2101 are met (step S2101: N) or when the control section 11 does not determine that the conditions in step S2104 are met (step S2104: N), the control section 11 sets template data (0) which indicates that none of the templates is a match in the match data (Match [C51]) (step S2106) and terminates this processing.

Figure 32:
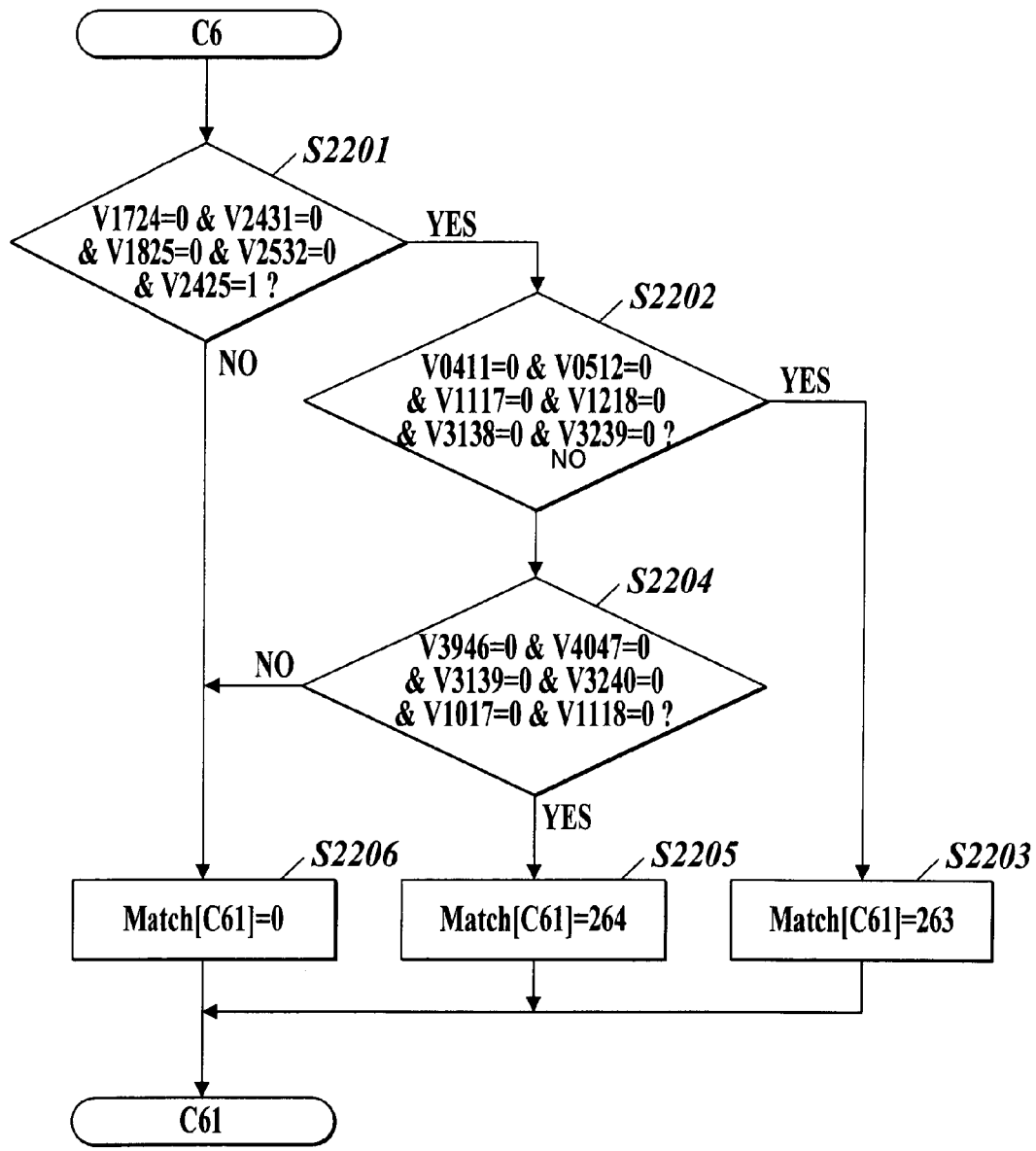
FIG. 32 is a flowchart which explains processing S.

Next, processing R will be described in detail with reference to FIG. 32. The processing R is optimized processing in which the above described processing K and processing L are combined.

First, the control section 11 determines whether the edge determination flag (V1724) is 0, the edge determination flag (V2431) is 0, the edge determination flag (V1825) is 0, the edge determination flag (V2532) is 0 and the edge determination flag (V2425) is 1 (step S2201). When the control section 11 determines that the conditions in step S2201 are met (step S2201: Y), the control section 11 determines whether the edge determination flag (V0411) is 0, the edge determination flag (V0512) is 0, the edge determination flag (V1117) is 0, the edge determination flag (V1218) is 0, the edge determination flag (V3138) is 0 and edge determination flag (V3239) is 0 (step S2202). When the control section 11 determines that the conditions in step S2202 are met (step S2202: Y), the control section 11 sets template data (263) in the match data (Match [C61]) (step S2203) and terminates this processing.

On the other hand, when the control section 11 does not determine that the conditions in step S2202 are met (step S2202: N), the control section 11 determines whether the edge determination flag (V3946) is 0, the edge determination flag (V4047) is 0, the edge determination flag (V3139) is 0, the edge determination flag (V3240) is 0, the edge determination flag (V1017) is 0 and the edge determination flag (V1118) is 0 (step S2204). When the control section 11 determines that the conditions in step S2204 are met (step S2204: Y), the control section 11 sets template data (264) in the match data (Match [C61]) (step S2205) and terminates this processing.

Moreover, when the control section 11 does not determine that the conditions in step S2201 are met (step S2201: N) or when the control section 11 does not determine that the conditions in steps S2204 are met (step S2204: N), the control section 11 sets the template data (0) which indicates that none of the templates is a match in the match data (Match [C61]) (step S2206) and terminates this processing.

Next, processing to obtain the maximum value among values indicated by template data of C11 to C16, which are obtained by executing the above described processing M to processing R, will be explained in detail with reference to FIG. 33.

First, the control section 11 refers to the match data (Match [C61]) and determines whether data other than 0 is set in the match data (Match [C61]) (step S2301). That is, the control section 11 determines whether template data (263) or template data (264) is set in the match data (Match [C61]). When the control section 11 determines that data other than 0 is set in the match data (Match [C61]) (step S2301: Y), the control section 11 sets the template data which is set in the match data (Match [C61]) in the match data (Match [C1000]) in a predetermined storage region of the RAM 11b (step S2302) and terminates this processing.

On the other hand, when the control section 11 does not determine that data other than 0 is set in the match data (Match [C61]) (step S2301: N), the control section refers to the match data (Match [C51]) and determines whether data other than 0 is set in the match data (Match [C51]) (step S2303). That is, the control section 11 determines whether template data (261) or template data (262) is set in the match data (Match [C51]). When the control section 11 determines that data other than 0 is set in the match data (Match [C51]) (step S2303: Y), the control section sets the template data which is set in the match data (Match [C51]) in the match data (Match [C1000]) (step S2304) and terminates this processing.

On the other hand, when the control section 11 does not determine that data other than 0 is set in the match data (Match [C51]) (step S2303: N), the control section 11 refers to the match data (Match [C41]) and determine whether data other than 0 is set in the match data (Match [C41]) (step S2305). That is, the control section 11 determines whether template data (253) or template data (254) is set in the match data (Match [C41]). When the control section 11 determines that data other than 0 is set in the match data (Match [C41]) (step S2305: Y), the control section sets the template data which is set in the match data (Match [C41]) in the match data (Match [C1000]) (step S2306) and terminates this processing.

On the other hand, when the control section 11 does not determine that data other than 0 is set in the match data (Match [C41]) (step S2305: N), the control section 11 refers to the match data (Match [C31]) and determines whether data other than 0 is set in the match data (Match [C31]) (step S2307). That is, the control section 11 determines whether template data (251) or template data (252) is set in the match data (Match [C31]). When the control section 11 determines that data other than 0 is set in the match data (Match [C31]) (step S2307: Y), the control section 11 sets the template data which is set in the match data (Match [C31]) in the match data (Match [C1000]) (step S2308) and terminates this processing.

On the other hand, when the control section 11 does not determine that data other than 0 is set in the match data (Match [C31]) (step S2307: N), the control section 11 refers to the match data (Match [C21]) and determines whether data other than 0 is set in the match data (Match [C21]) (step S2309). That is, the control section 11 determines whether either one of template data (23), template data (24), template data (233) or template data (243) is set in the match data (Match [C21]). When the control section 11 determines that data other than 0 is set in the match data (Match [C21]) (step S2309: Y), the control section sets the template data which is set in the match data (Match [C21]) in the match data (Match [C1000]) (step S2310) and terminates this processing.

On the other hand, when the control section 11 does not determine that data other than 0 is set in the match data (Match [C21]) (step S2309: N), the control section refers to the match data (Match [C11]) and determines whether data other than 0 is set in the match data (Match [C11]) (step S2311). That is, the control section 11 determines whether either one of template data (21), template data (22), template data (213) or template data (223) is set in the match data (Match [C11]). When the control section 11 determines that data other than 0 is set in the match data (Match [C11]) (step S2311: Y), the control section 11 sets the template data which is set in the match data (Match [C11]) in the match data (Match [C1000]) (step S2312) and terminates this processing.

On the other hand, when the control section 11 does not determine that data other than 0 is set in the match data (Match [C11]) (step S2311: N), the control section 11 sets the template data (0) which indicates that none of the templates is a match in the match data (Match [C1000]) (step S2313) and terminated this processing.

Final template data can also be specified by executing the above processing.

In this embodiment, an example in which the image processing section 10 is applied in the MFP 100 is described. However, the image processing section 10 can also be applied to image display apparatuses such as LCD (Liquid Crystal Display) and the like.

Further, in this embodiment, an example in which the image processing section 10 is applied in the MFP 100 which can perform color printing of CMYK is described. However, the image processing section 10 can be applied in image forming apparatuses which perform printing of any single color of CMYK.

Furthermore, in this embodiment, edge detections are performed in advance for all of the pixel combinations which are subject for edge determination in the edge determination section 103. However, edge detections do not need to be performed in advance, and edge detection may be performed on the pixel combination required for determination every time a condition for an edge is to be determined when narrowing down the templates in the template matching section 104. In such way, a part of calculations for performing edge detections can be omitted and the amount of calculation can be reduced.

Moreover, in this embodiment, final template data having the maximum template data is selected after extracting all the templates which match the conditions based on the edge determination results. However, for example, determination whether a template meets the conditions can be performed in descending order from the maximum template data, and a template can be selected at the time when the conditions are met.

Further, in this embodiment, edge determination results are held and the maintained edge determination flags are used again in the next edge determination processing and thereafter. However, edge determination results do not need to be held, and edge determination may be performed every time when edge determination processing is executed.

Furthermore, in this embodiment, an example in which a non-volatile memory such as a hard disk or a semiconductor is used as a computer readable medium of the program according to the present invention is disclosed. However, it is not limited to this example. As for other computer readable medium, a portable storage medium such as a CD-ROM can also be applied. Further, a carrier wave can be applied as a medium for providing data of the program according to the present invention through communication circuits.

The entire disclosure of Japanese Patent Application No. 2010-287152 fined on Dec. 24, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus for performing anti-aliasing on input image data, comprising:
   a viewing window which includes a focused pixel;
   a viewing window setting section which sets the viewing window in a predetermined size;
   an edge determination section which extracts a plurality of combinations of two predetermined adjacent pixels in the viewing window set by the viewing window setting section, calculates a difference between input pixel values of the two extracted pixels for each combination, and performs edge determination according to whether the difference is equal to or more than a threshold value for each combination;
   a template selection section which specifies a matching template from a plurality of templates and outputs template data on a basis of a combination of determination results obtained by the edge determination section; and
   a pixel value calculation section which outputs an output pixel value of the focused pixel by carrying out a weighted addition of an input pixel value of the focused pixel and an input pixel value of a predetermined neighboring pixel which is adjacent to the focused pixel on a basis of the template data input from the template selection section.

2. The image processing apparatus of claim 1, wherein when selecting the template, the template selection section specifies the template with reference to a smaller number of edge determination results than the number of pixels referred to for obtaining the edge determination results.

3. The image processing apparatus of claim 1, further comprising a storage section which stores the determination results obtained by the edge determination section,
   wherein the viewing window setting section sets the viewing window so that the focused pixel is located at a predetermined position and changes the setting position of the viewing window every time the output pixel value is obtained so that a pixel which is to be the focused pixel is selected in a predetermined order, and
   wherein the template selection section selects the template by referring to at least a part of the determination results stored in the storage section.

4. An image processing method for performing anti-aliasing on input image data, comprising:
   setting a viewing window which includes a focused pixel in a predetermined size;
   extracting a plurality of combinations of two predetermined adjacent pixels in the viewing window set in the setting;
   calculating a difference between input pixel values of the two extracted pixels for each combination by;
   performing edge determination according to whether the difference is equal to or more than a threshold value for each combination;
   specifying a matching template from a plurality of templates and outputting template data on a basis of a combination of determination results obtained in the performing of edge determination; and
   outputting an output pixel value of the focused pixel by carrying out a weighted addition of an input pixel value of the focused pixel and an input pixel value of a predetermined neighboring pixel which is adjacent to the focused pixel based on the input template data.

5. The image processing method of claim 4, wherein when selecting the template in the specifying and outputting steps, the number of edge determination results referred to for specifying the template is smaller than the number of pixels referred to for obtaining the edge determination results.

6. The image processing method of claim 4, further comprising storing the determination results obtained in the performing of edge determination in a predetermined storage section;
   wherein, in the setting step, the viewing window is set so that the focused pixel is located at a predetermined position and the setting position of the viewing window is changed every time the output pixel value is obtained so that a pixel which is to be the focused pixel is selected in a predetermined order, and
   wherein, in the specifying step, the template is selected by referring to at least a part of the determination results stored in the storage section.

* * * * *